(12) United States Patent
Bender

(10) Patent No.: US 10,419,399 B2
(45) Date of Patent: Sep. 17, 2019

(54) METHOD FOR AT LEAST ONE SUBMITTER TO COMMUNICATE SENSITIVE INCIDENT INFORMATION AND LOCATIONS TO RECEIVERS

(71) Applicant: T. Gregory Bender, Harrison, NY (US)

(72) Inventor: T. Gregory Bender, Harrison, NY (US)

( * ) Notice: Subject to any disclaimer, the term of this patent is extended or adjusted under 35 U.S.C. 154(b) by 592 days.

(21) Appl. No.: 14/754,655

(22) Filed: Jun. 29, 2015

(65) Prior Publication Data

US 2015/0304300 A1    Oct. 22, 2015

Related U.S. Application Data

(63) Continuation-in-part of application No. 13/902,801, filed on May 25, 2013, now Pat. No. 9,071,579.

(60) Provisional application No. 61/652,099, filed on May 25, 2012, provisional application No. 61/662,305, filed on Jun. 20, 2012.

(51) Int. Cl.
```
H04L 12/18      (2006.01)
H04L 12/58      (2006.01)
H04L 29/06      (2006.01)
```
(52) U.S. Cl.
CPC ...... *H04L 63/0421* (2013.01); *H04L 12/1895* (2013.01); *H04L 51/14* (2013.01); *H04L 63/104* (2013.01); *H04L 51/32* (2013.01)

(58) Field of Classification Search
CPC .... H04L 63/0421; H04L 51/14; G06Q 50/265
See application file for complete search history.

(56) References Cited

U.S. PATENT DOCUMENTS

| | | | | |
|---|---|---|---|---|
| 2008/0305763 | A1* | 12/2008 | Wijayanathan ... | H04M 3/42195 455/404.2 |
| 2010/0323657 | A1* | 12/2010 | Barnard ................ | H04M 1/663 455/404.1 |
| 2012/0066345 | A1* | 3/2012 | Rayan .................. | H04M 3/5116 709/218 |

* cited by examiner

Primary Examiner — Farid Homayounmehr
Assistant Examiner — Suman Debnath
(74) *Attorney, Agent, or Firm* — Lainie E. Parker; Richard Mark Blank

(57) ABSTRACT

The present invention relates to a method for sending, receiving, reporting and/or responding to mood related, time-sensitive, live situation, and/or secretive matter messages, through a one-step submission, and/or Smart Button activation anonymous submit process and/or targeted authorized receipt process, having the generating, assigning, and utilizing of unique identifiers and corresponding actionable and searchable administrative report generating process. More specifically, the invention relates to a method for permitting submitter(s) to choose the degree of anonymity and/or submit information/content and/or location and send that information/content and/or location, by means of a user interface, Smart Button, or other computer, mobile device, mobile phone, smart pad, electronic device, input device, communication device, touchscreen computing device, smart device, or tablet to provide an activated application and open a log-in screen to authorized receiver(s) who may access such information/content, which can be encrypted, in whole or in part, and act, report, forward or respond accordingly.

10 Claims, 45 Drawing Sheets

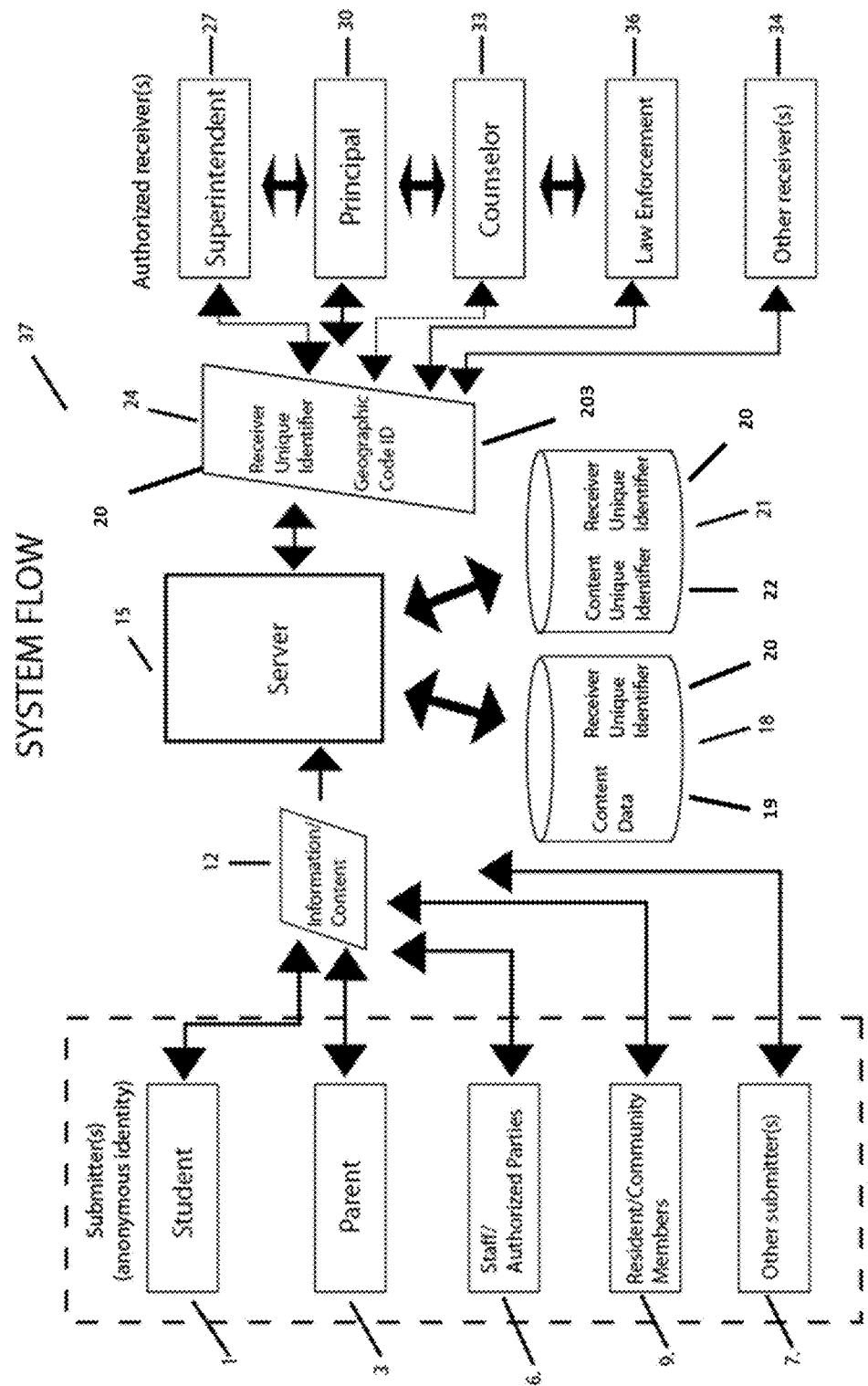

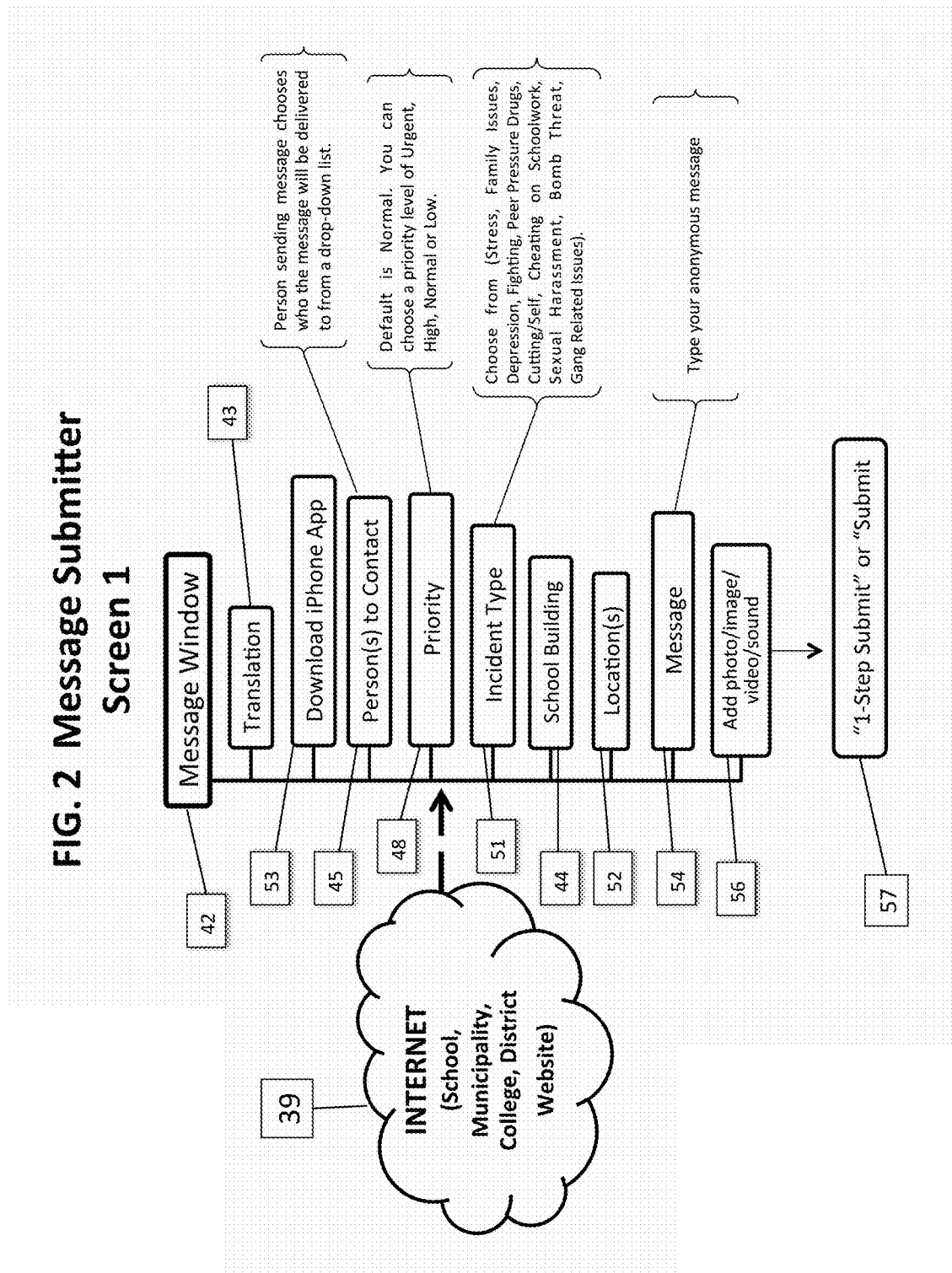

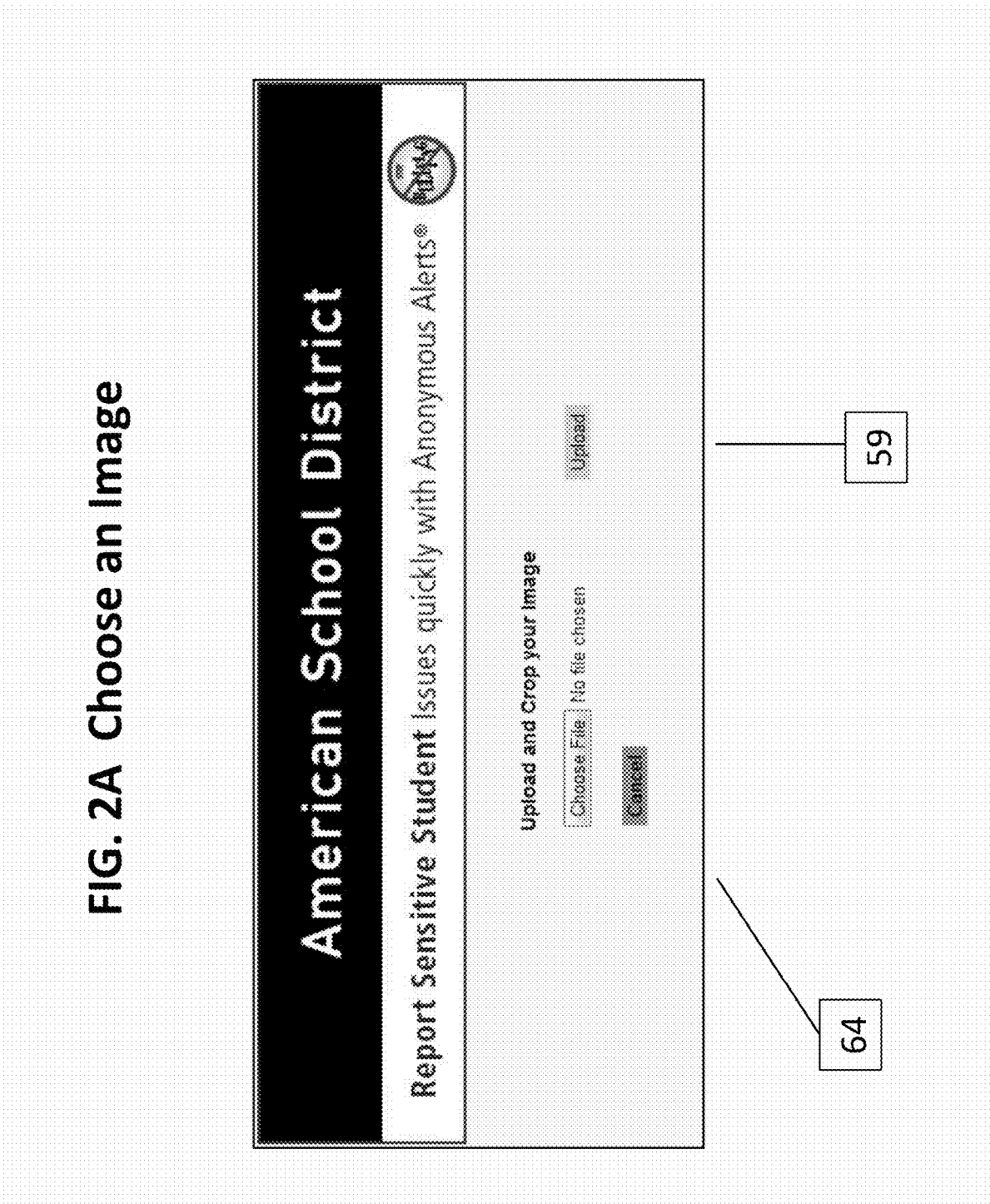
FIG. 2A Choose an Image

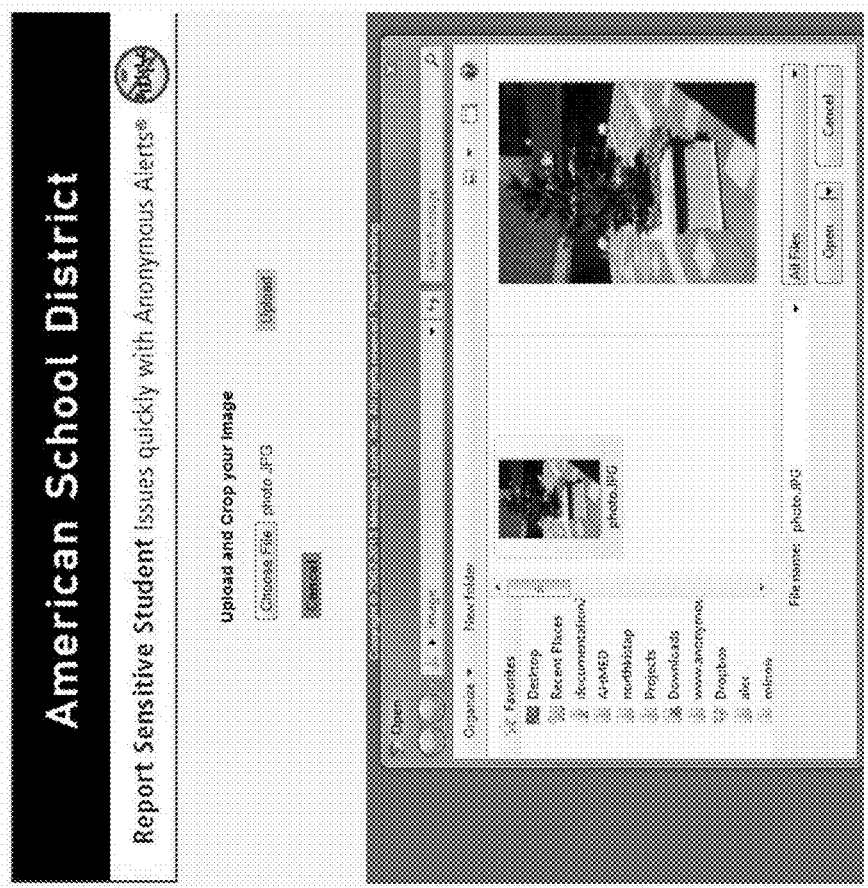
FIG. 2B Selecting the image

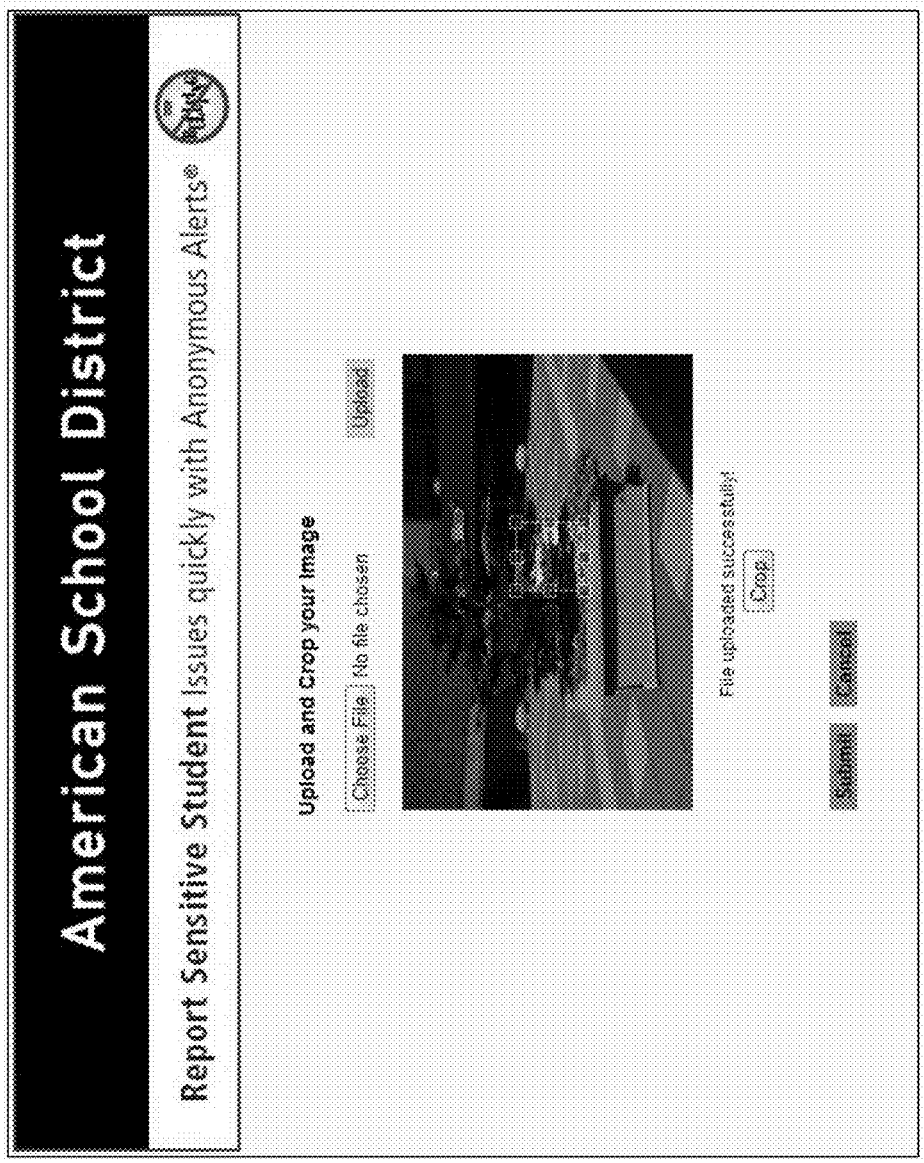

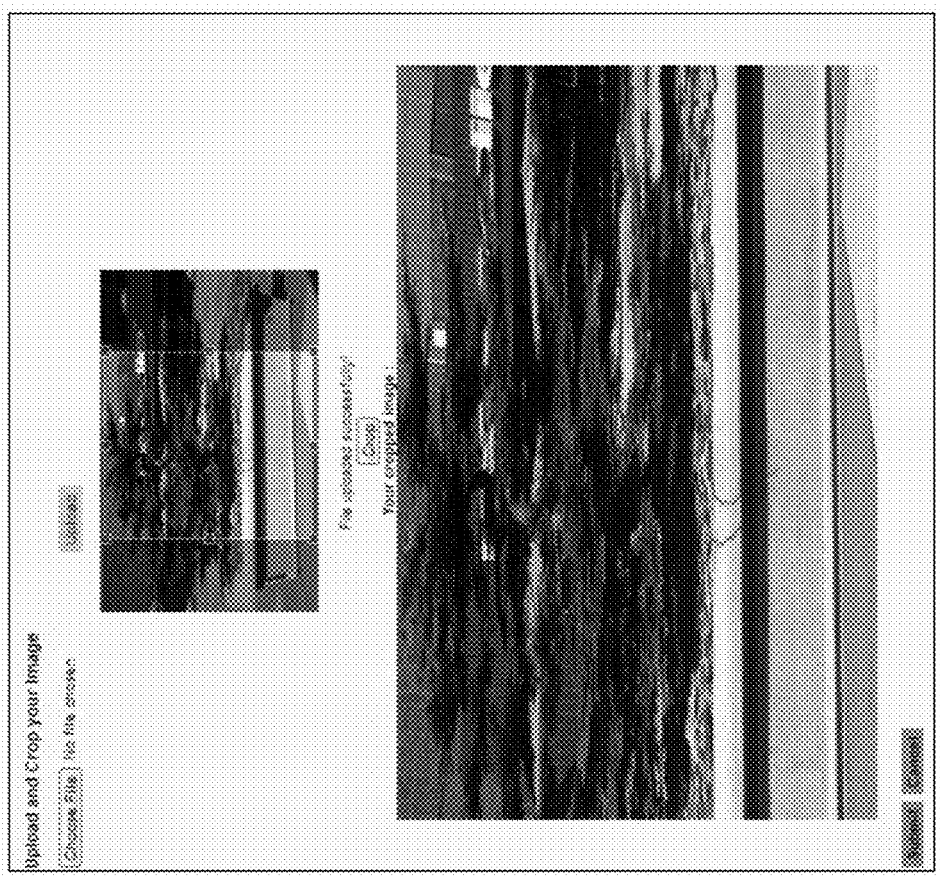
FIG. 2D Crop the image

FIG. 2F Mobile Application Screen
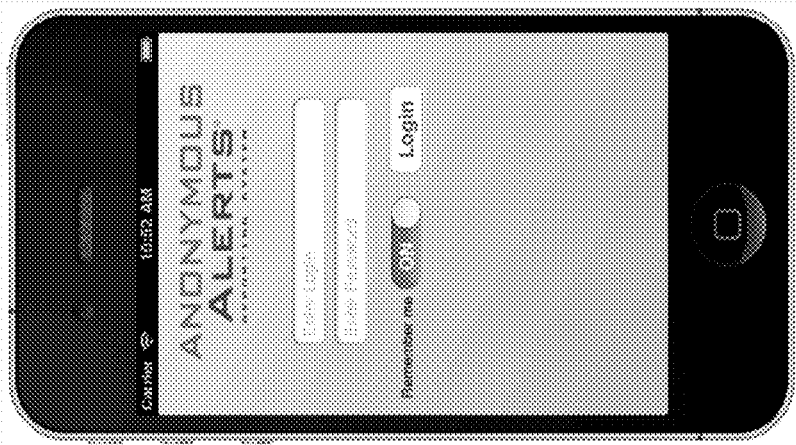
Submitter enters a unique code identifier and password to activate Community view and submit anonymous messages to authorized Recipient(s)
Mobile Screen 2.

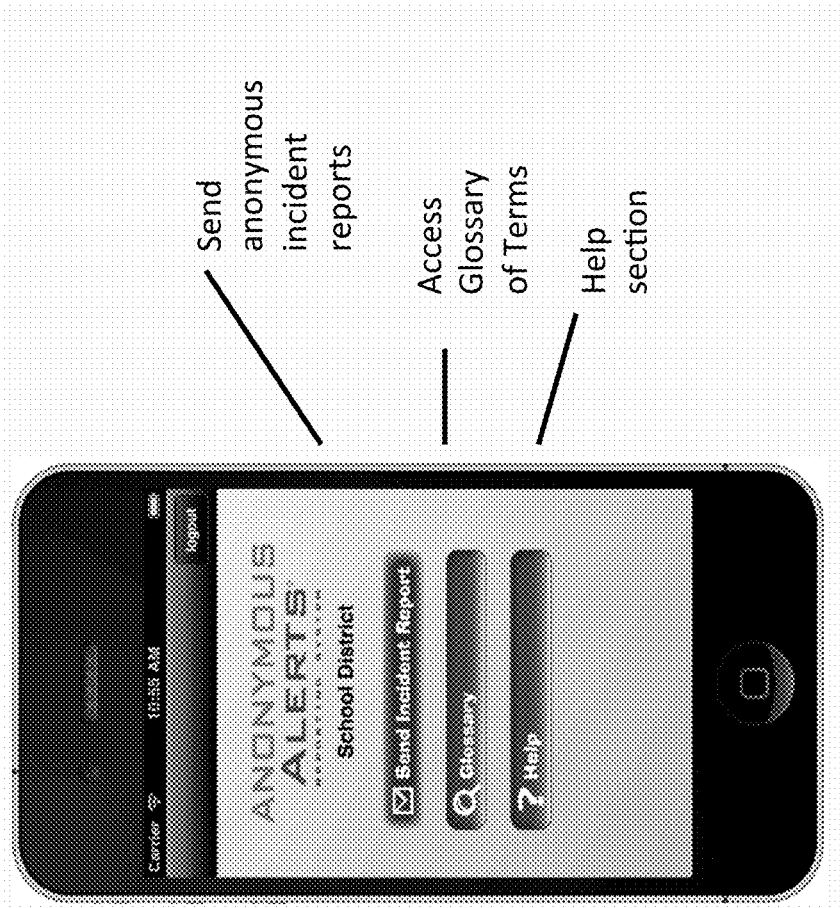
FIG. 2G Mobile Application Screen
Mobile Screen 3.

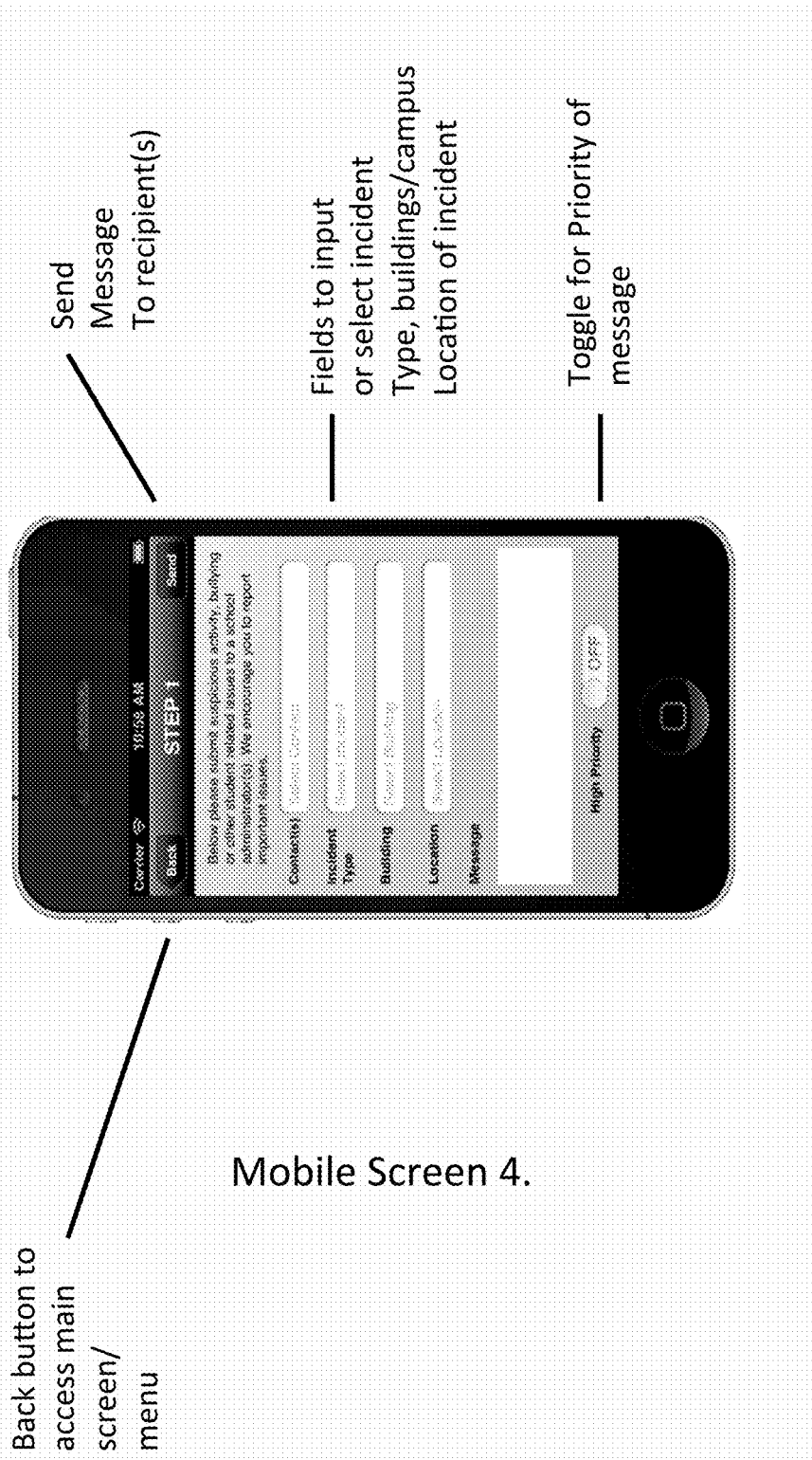
FIG. 2H Mobile Application Screen
Mobile Screen 4.

FIG. 2I Mobile Application Screen
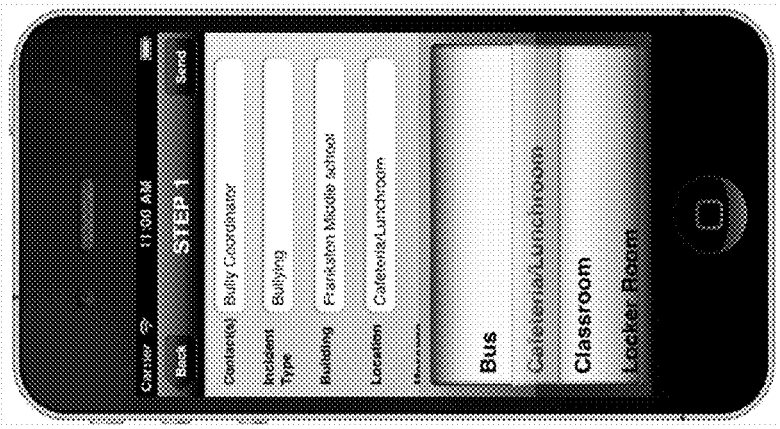
Submitter can select location with a picker that is data driven with custom locations
Mobile Screen 5.

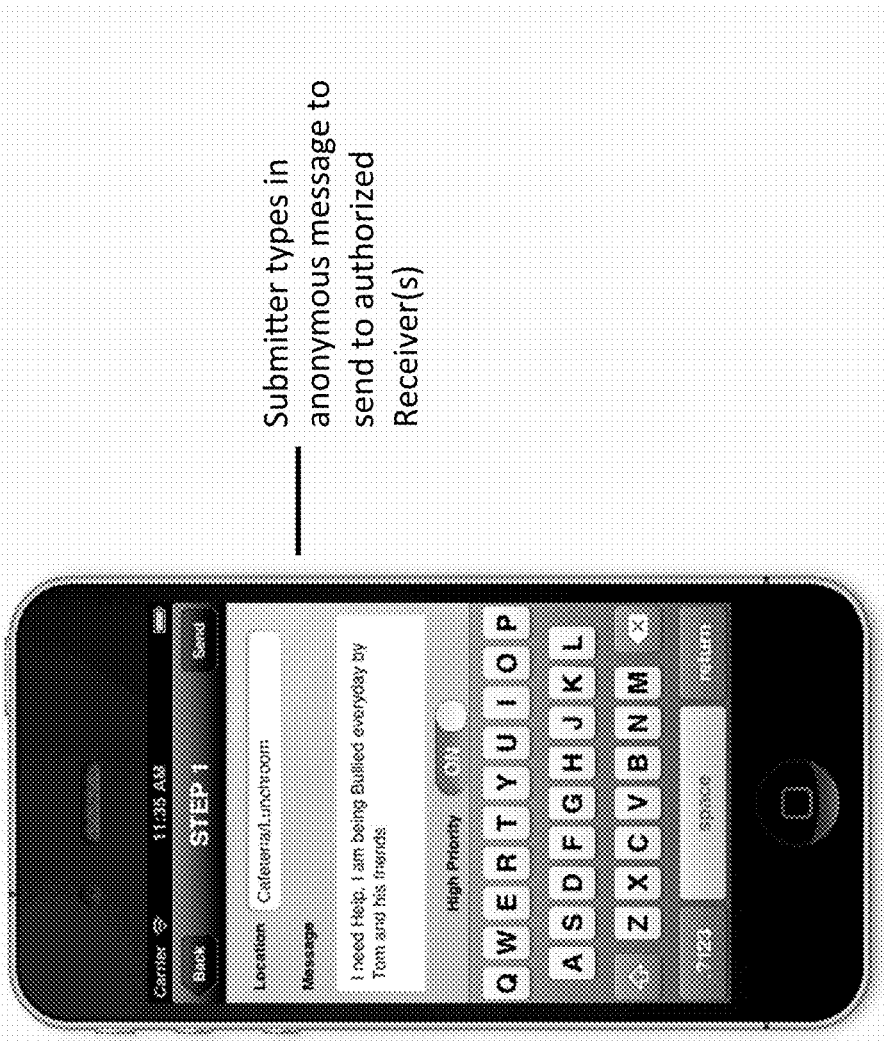
FIG. 2J Mobile Application Screen
Mobile Screen 6.

FIG.2K Mobile Application Screen
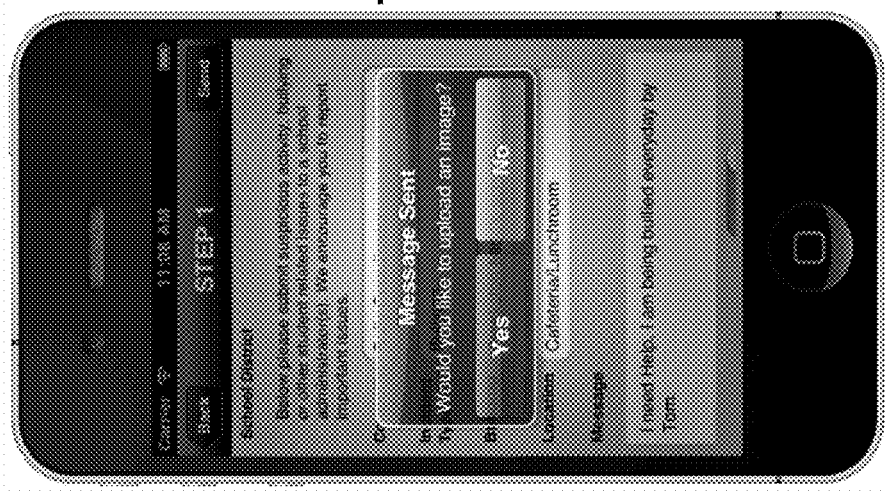
Submitter is prompted to upload an image At their discretion If they have an image to upload about an incident report
Mobile Screen 7.

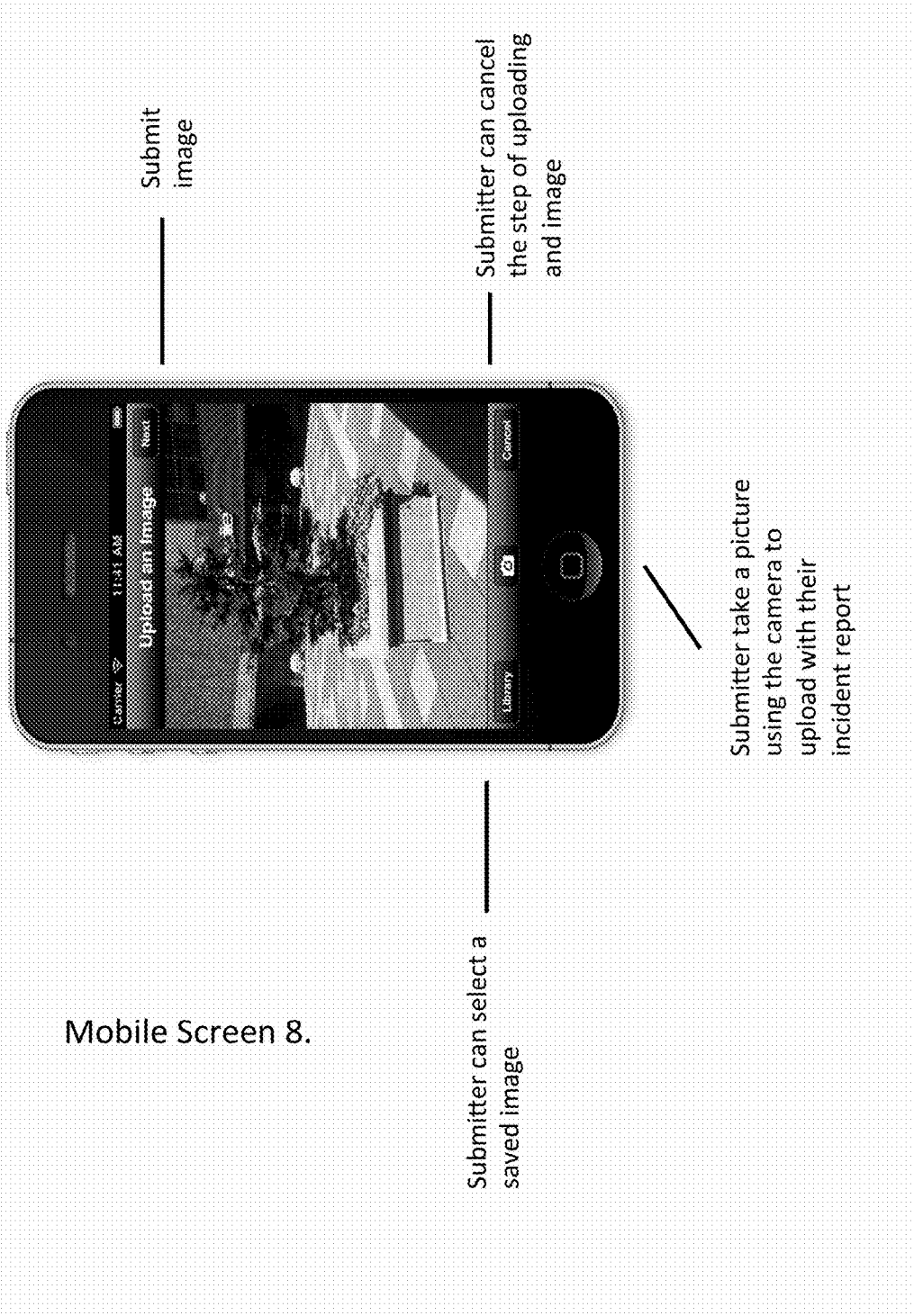
FIG.2L Mobile Application Screen
Mobile Screen 8.

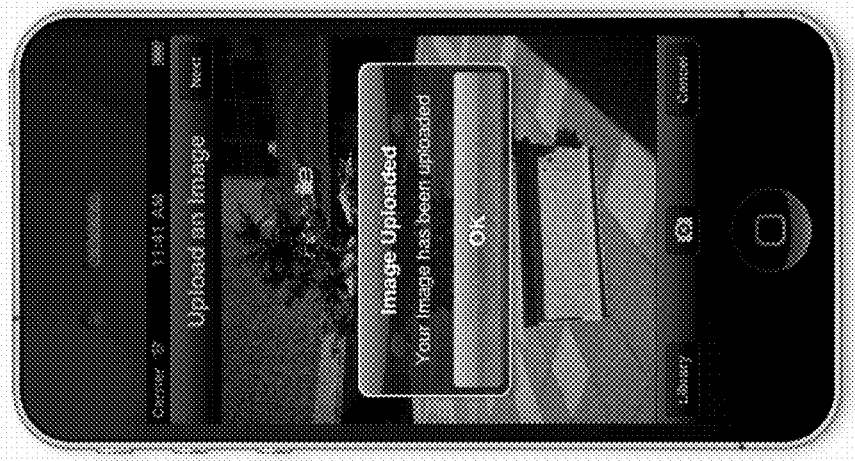
FIG.2M Mobile Application Screen
Confirmation screen
Details that the image is successfully uploaded with text report of the incident by the submitter
Mobile Screen 9.

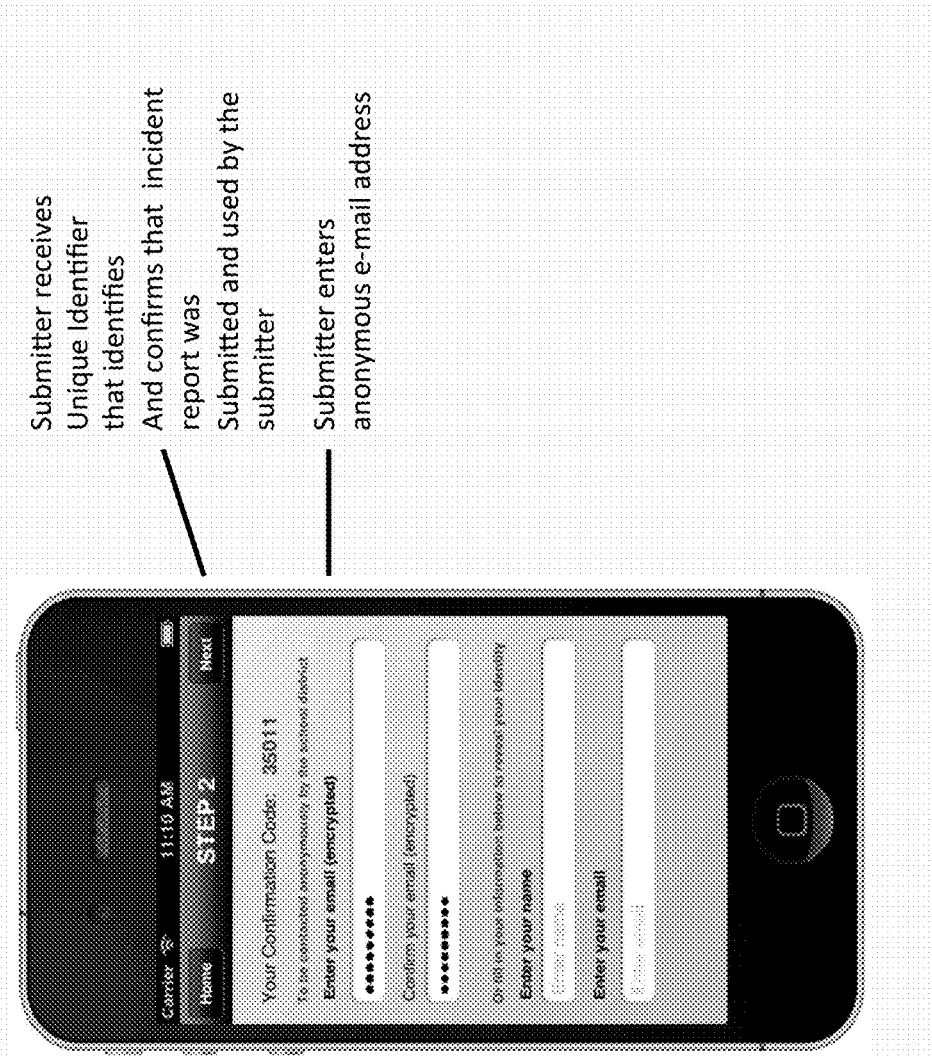
FIG.2N Mobile Application Screen
Mobile Screen 10.

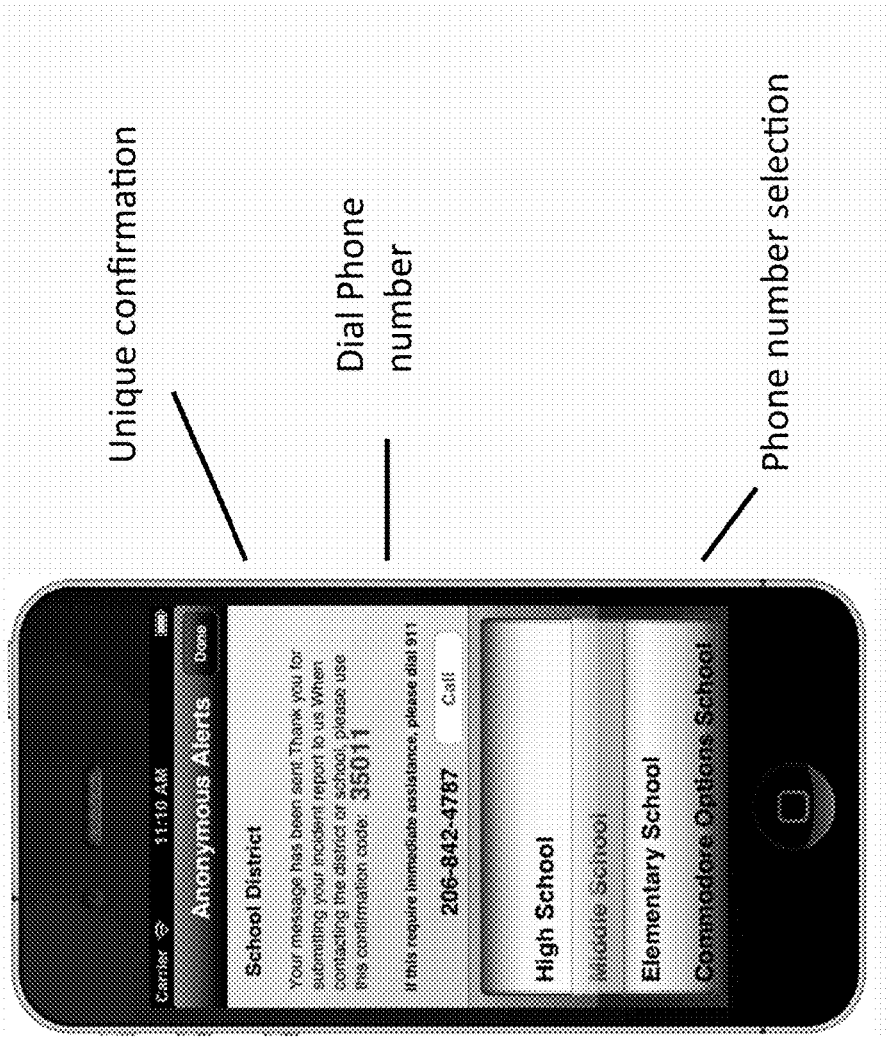
FIG. 20 Mobile Application Screen
Mobile Screen 11.

FIG.2P Mobile Application Screen
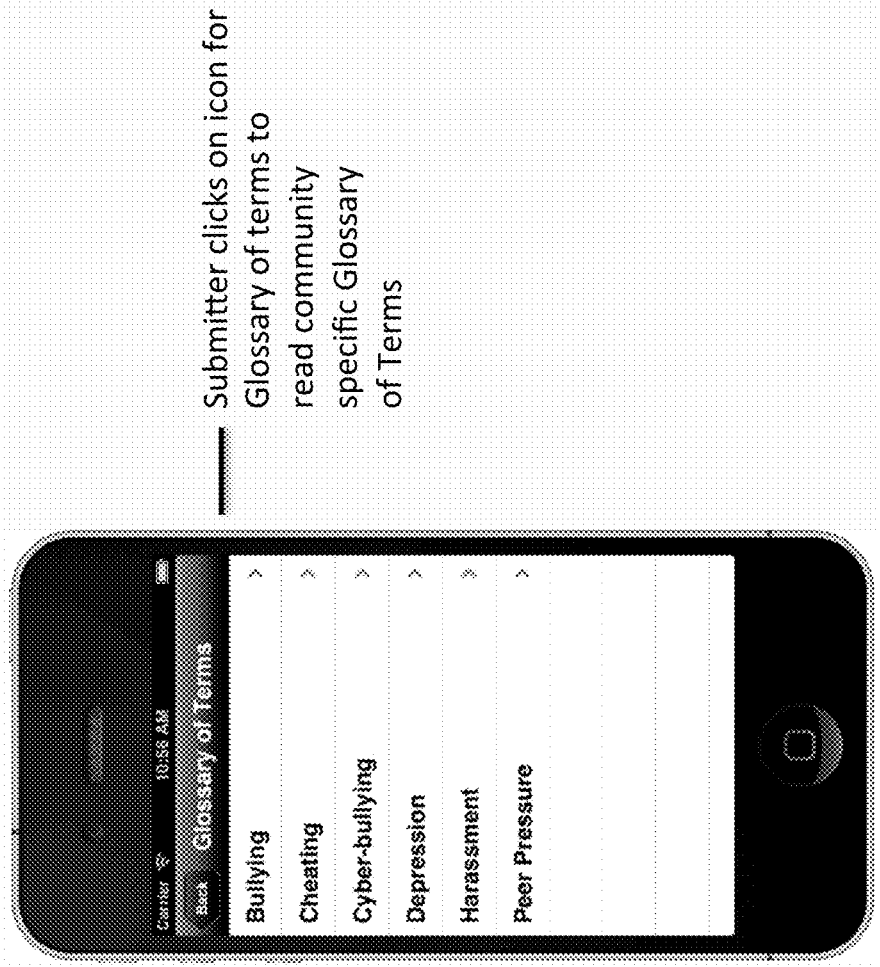
Submitter clicks on icon for Glossary of terms to read community specific Glossary of Terms
Mobile Screen 12.

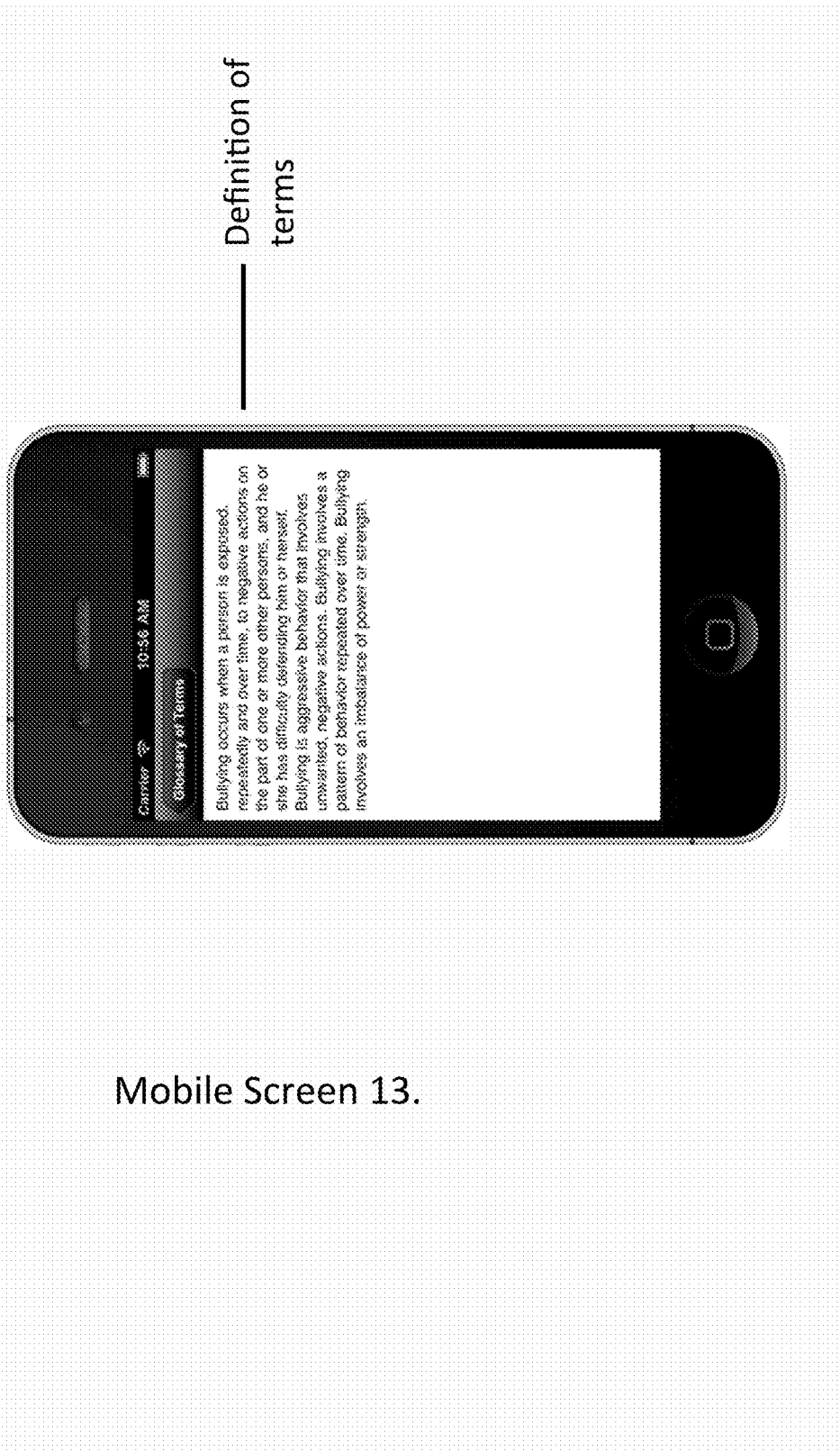
FIG.2Q Mobile Application Screen
Mobile Screen 13.

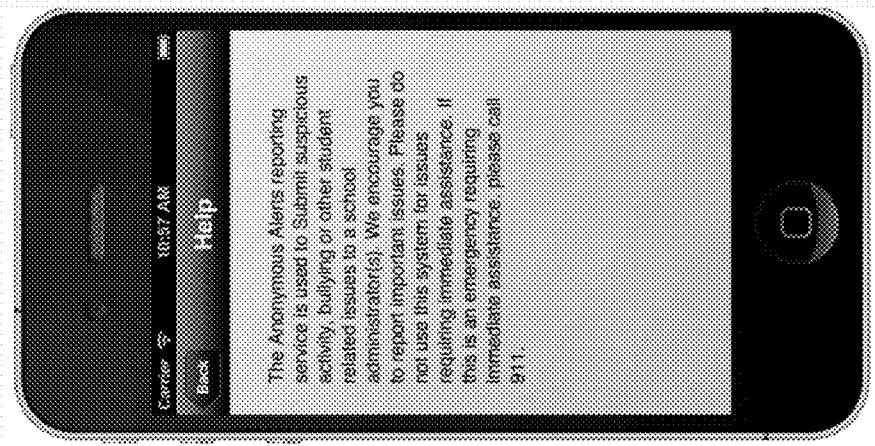
FIG.2R Mobile Application Screen — Help instructions
Mobile Screen 14.

FIG.2S Message Receiver / Message Recipient
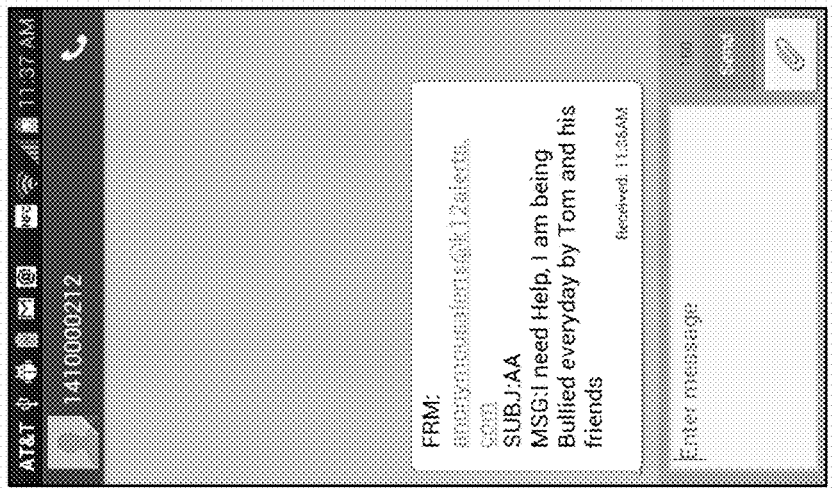
Mobile Screen 15.

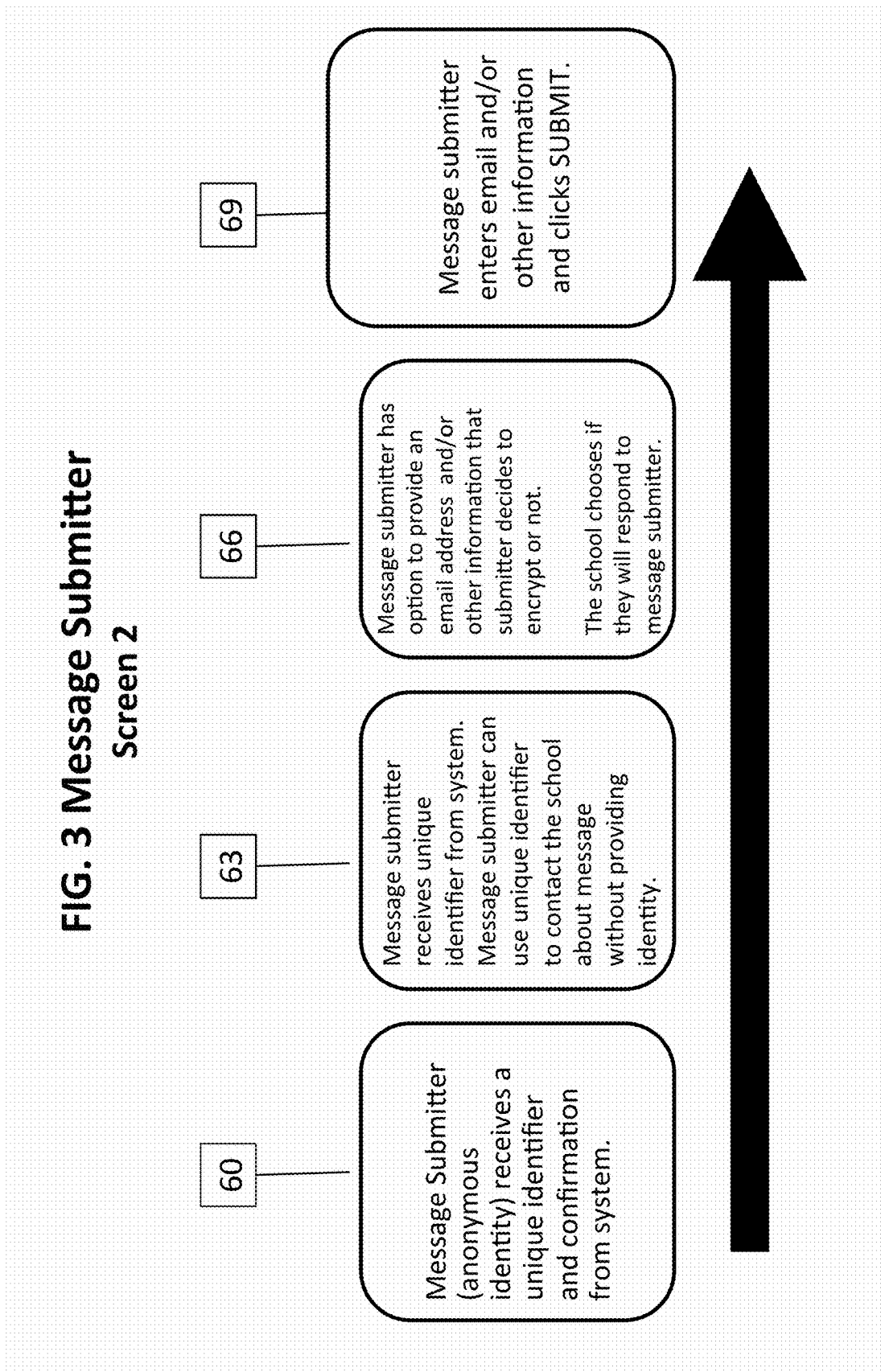

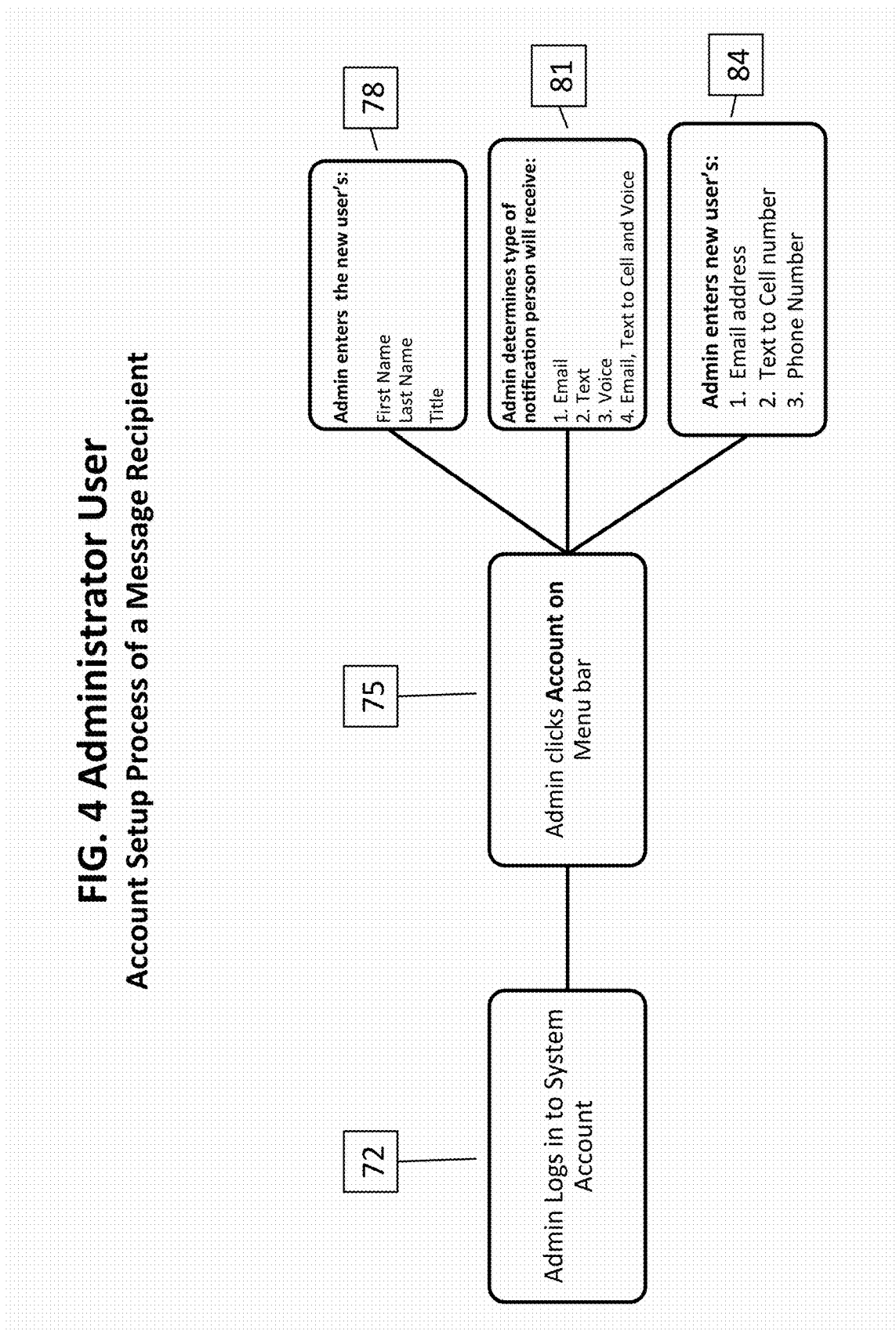

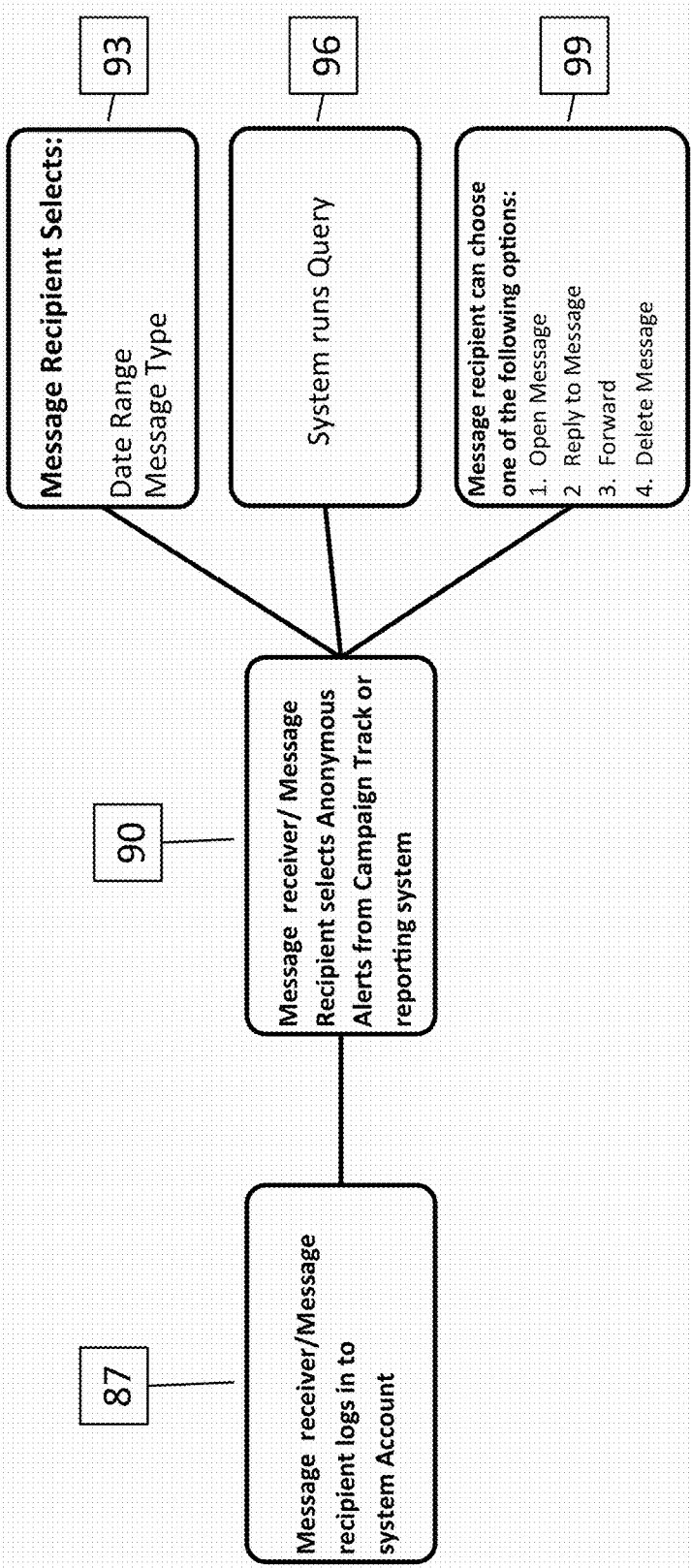

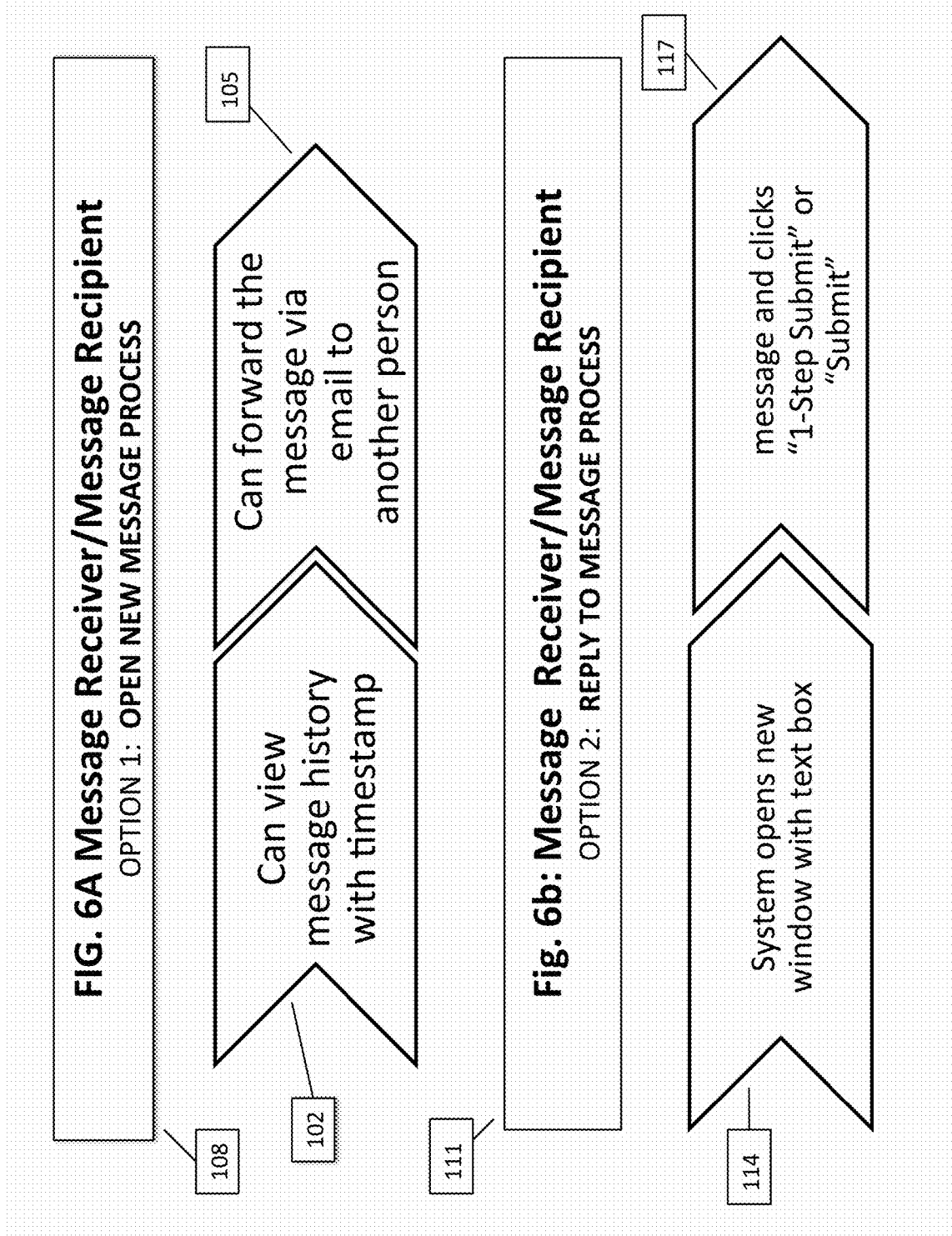

FIG. 7 Administrator User Setup Screen

FIG. 8 Anonymous Alert Report
(Search Options)

Anonymous Alerts Report

Search for Anonymous Messages Submitted

Beginning Search Date: [ ] / [ ] / [ ]  (mm/dd/yyyy) Select Date

Ending Search Date: [ ] / [ ] / [ ]  (mm/dd/yyyy) Select Date

Anonymous Alert Type: Bullying

Confirmation Code: [ ]

Building: Select Option
- Bullying
- Select Option
- Bomb Threat
- Cheating on schoolwork
- Cutting/Self-Injury
- Depression
- Drugs
- Family Issues
- Fighting
- Gang Related Issue
- Other
- Peer Pressure
- Sexual Harrasment
- Stress Status: Bullying Location: Select Option Credible: Select Option

[Search]

1 2 3 ...Last >>

Page 1 of 14

| Date Submitted | Code | Priority | Message | Reply-to | Credible | Status | |
|---|---|---|---|---|---|---|---|
| 2/22/2013 7:21 PM | 36299 | Normal | Click Here | Click Here | YES | Open | Delete |
| 2/25/2013 2:19 PM | 65840 | Normal | Click Here | N/A | YES | Open | Delete |
| 2/25/2013 4:54 PM | 42202 | Normal | Click Here | N/A | YES | Open | Delete |
| 2/25/2013 5:01 PM | 25026 | Normal | Click Here | N/A | YES | Open | Delete |
| 2/25/2013 5:33 PM | 36543 | Normal | Click Here | N/A | YES | Open | Delete |

FIG. 9 Anonymous Alert Report
(System Query Results)

Anonymous Alerts Report

Search for Anonymous Messages Submitted

Beginning Search Date: [ ] / [ ] / [ ]  (mm/dd/yyyy) Select Date

Ending Search Date: [ ] / [ ] / [ ]  (mm/dd/yyyy) Select Date

Anonymous Alert Type: Bullying        Confirmation Code: [          ]

Building: Select Option        Location: Select Option

Status: Select Option        Credible: Select Option (Pie Chart)  (View All)  (Search)

1 2 3 4 5 6 7 8 9 10  Next >   Last >>

Page 1 of 14

| Date Submitted | Code | Anonymous Alert Type | Priority | Message | Reply-to | Credible | Status | |
|---|---|---|---|---|---|---|---|---|
| 2/20/2013 7:21 PM | 36299 | Bullying | Normal | Click Here | Click Here | YES | Open | Delete |
| 2/25/2013 2:19 PM | 66840 | Bullying | Normal | Click Here | N/A | YES | Open | Delete |
| 2/25/2013 4:54 PM | 42202 | Bullying | Normal | Click Here | N/A | YES | Open | Delete |
| 2/25/2013 5:01 PM | 25026 | Bullying | Normal | Click Here | N/A | YES | Open | Delete |
| 2/25/2013 5:33 PM | 35543 | Bullying | Normal | Click Here | N/A | YES | Open | Delete |

FIG. 10 Anonymous Alert Report
(View Message Screen)

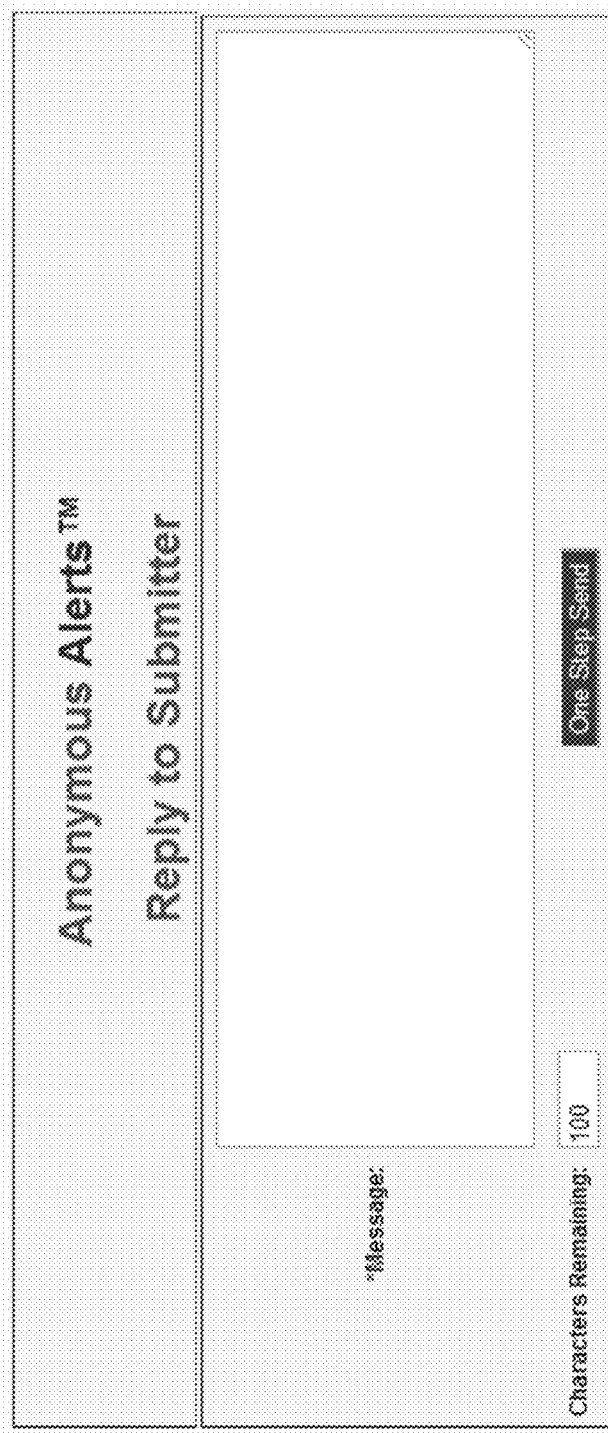
FIG. 11: Anonymous Alert Report
(Administrator Reply Screen)

FIG. 12 Message Submitter User Interface

FIG. 13: Message Submitter User Interface
(Report Incident Type drop-down list option)

American School District

Report Sensitive Student Issues quickly with Anonymous Alerts®

Anonymous Alerts®

[En español]

[Submit]

Step 1:

Students or parents in the school community can anonymously submit any suspicious activity, bullying or other student related issues to a school administrator(s). We encourage you to report important issues. Once you complete the contact form below you will receive a confirmation that your information has been submitted to the school district. False reporting will be taken seriously to the full extent of the law.

Please do not use this system for issues requiring immediate assistance. If this is an emergency requiring immediate assistance, please call 911.

Person(s) to Contact: [Select contact ▼]    Priority: [Normal ▼]

Report Incident Type: [Select type ▼]    School Building: [Select Building ▼]

Location:
- Select type
- Bomb Threat
- Cheating on schoolwork
- Cutting/Self-Injury
- Depression
- Drugs
- Family Issues
- Fighting
- Gang Related Issue
- Harassment
- Other
- Peer Pressure
- Stress Report Incident: (Be specific – include date, time, event(s), and person(s) involved)

Click here to add a photo

Characters Remaining: 150

Your IP Address: 11.583.269.327

FIG. 14: Message Submitter User Interface
(Person of Contact drop-down list option)

FIG. 15 Message Submitter User Interface
(Confirmation that message was received)

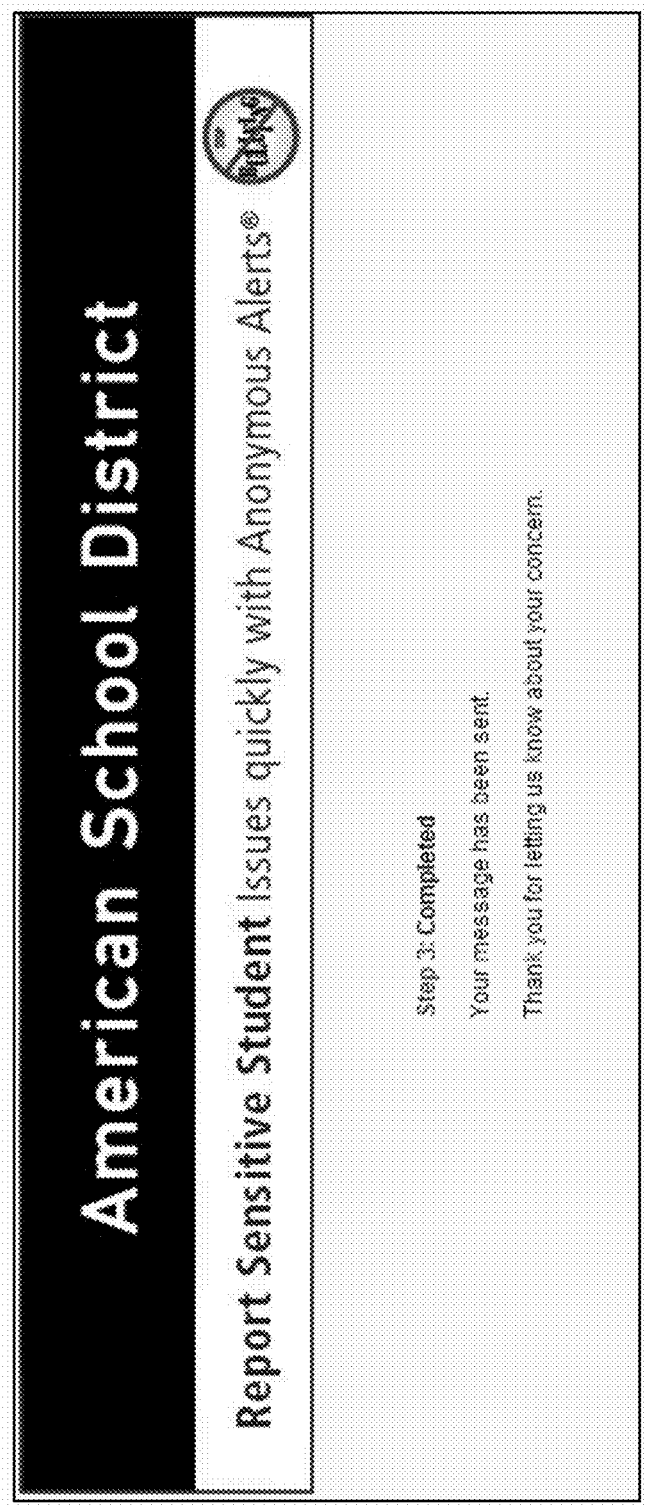
FIG. 16 Step 3

FIG. 20 Mobile to Mobile Message Sending and Receiving with Unique Content Identifier and Receiver Unique Identifier

FIG. 21

METHOD FOR AT LEAST ONE SUBMITTER TO COMMUNICATE SENSITIVE INCIDENT INFORMATION AND LOCATIONS TO RECEIVERS

CROSS-REFERENCE TO RELATED APPLICATIONS

This application is a continuation-in-part of and claims priority to U.S. Nonprovisional application Ser. No. 13/902,801, filed May 25, 2013, which claims priority to U.S. Provisional Application No. 61/652,099, filed May 25, 2012, and Provisional Application for U.S. Patent No. 61/662,305, filed Jun. 20, 2012, all of which are incorporated herein by reference for all purposes.

BACKGROUND OF THE INVENTION

The present invention relates to a method for sending, receiving, reporting, and/or responding to mood related, time-sensitive, live situation, and/or secretive matter messages, through a one-step submission, and/or Smart Button activation anonymous submit process to authorized receiver(s) via at least one of a communication networks, social media platforms, and/or targeted authorized receipt process, and generating, assigning, and utilizing unique identifiers and corresponding actionable and searchable administrative report generating process. More specifically, the invention relates to a method for permitting submitter(s) to choose the degree of anonymity and/or submit information/content and/or location and send that information/content and/or location, by means of a user interface, text link, and/or Smart Button, or a computer, mobile device, mobile phone, smart pad, electronic device, smart watch, smart glasses, car play and alike, input device, communication device, touchscreen computing device, portable media player, smart device, or tablet to provide an activated application and open a log-in screen to authorized receiver(s) who may access such information/content, which can be encrypted, in whole or in part, and act, report, forward or respond accordingly.

Prompt distribution of live incidents, events, mood related, time-sensitive, and secretive, information is crucial to protection and authorized intervention concerning individual and community safety, and mitigating damage to persons, property and/or infrastructure. The advent of new methods of communication, such as e-mail, cell phones, instant messaging, Smart phones, tablets, computers, text messaging, and other Internet, world wide web, virtual network, and social media compatible devices has increased the ability to effectively communicate such mood related, time-sensitive, and secretive information to authorized individuals. As a result, it is advantageous for a specialized and focused information dissemination system to be adapted to utilize the Internet, virtual network, and/or social media for prompt and effective systems of notification and/or dissemination of sensitive information. Increased utilization of complex smart devices, tablets, mobile devices, associated mobile applications, and mobile icons, as well as, computers, e-mail, texting, instant messaging, and other communication devices and transmission methods can be exploited for their instant notification abilities, and their abilities to relay information back to authorized personnel in time sensitive situations.

A mobile application or mobile app as it is sometimes referred to, is a currently executing computer software application/program that can physically move information from one computer (mobile device) to another host server while it is being executed by the user/submitter. Mobile applications demonstrate many benefits and efficiencies and also immediacy of message/information distribution to an authorized host computer system.

One of the goals of this system is instant distribution of mood related, live incident, time-sensitive, and secretive, information to authorized persons identified by the system. One of the primary goals of this method is to enable persons to come forward with time sensitive and/or secretive information and submit it to authorized persons who can immediately respond to the information submitted.

SUMMARY OF THE INVENTION

The present invention is a computer implemented method for at least one submitter to communicate information comprising executing on at least one computer at least one of the following steps of: sending an anonymous communication from at least one submitter, from at least one user-interface of at least one input device, connected to at least one of the Internet, a virtual network, a communication network, social network, world wide web, WAN, and/or LAN, wherein said anonymous communication contains information sent to at least one receiver; generating at least one Unique Identifier for said information; sending the at least one Unique Identifier; matching the targeted receiver to a specific communication and information with a Receiver Unique Identifier; granting the targeted receiver access to communication and information by utilizing the Unique Identifier for said information with the Receiver Unique Identifier; wherein the targeted receiver is permitted to open communication(s), read the communication(s), act on the communication(s), forward the communication(s), respond to the communication(s), reply to the communication(s), and/or delete the communication(s) based on the inputted Receiver Unique Identifier; further comprising a step of the at least one receiver(s) responding to, forwarding, taking an action, and/or making a report based on the communication received from the at least one submitter.

The method can further comprise at least one of the following: whereby the said at least one receiver submitting information to be sent, is a targeted receiver for the said communication; encrypting the information, in part or in whole; decrypting the information, in part or in whole; whereby the information being submitted is encrypted to be sent to the said at least one receiver(s), wherein at least one of the at least one receiver(s) is a targeted receiver for the communication; whereby the communication and or transmission of data is through at least one of text, e-mail, phone, audio, visual, facsimile, instant message, social network transmission, communication, and/or data transmission; whereby the at least one Unique Identifier being generated is associated with the submitted information, in part or in whole; whereby the at least one Unique Identifier and at least one confirmation message is being sent to the said at least one submitter; choosing by the submitter to be identified as being non-anonymous, by submitting submitter or allowing access to related information, comprising their name, e-mail address, phone number, phone text number, network identity code, device identification code or location for non-anonymous communications to the said at least one receiver(s), wherein the submitter related information is stored in at least one data base to be associated with at least one Unique Identifier; whereby the matching of the targeted receiver to a specific communication and information targeted by the submitter is associated with at least one Unique Identifier stored in the database; providing a Receiver Unique Identifier to a host system administration device, system administration device, and/or to the targeted receiver.

The method can additionally comprise: the submitting of the encrypted information and any other information is sent to the said at least one receiver of a plurality of receivers, wherein the said at least one receiver of the plurality of receivers is a targeted receiver for the communication; the sending of the at least one Unique Identifier, and any non-encrypted information or message is to the said at least one receiver of the plurality of receivers;

The method can also be comprised of the submitting of an anonymous location from at least one submitter, from at least one user-interface of at least one input device, connected to at least one of the Internet, a virtual network, a communication network, social network, world wide web, WAN, and/or LAN, wherein said anonymous locator communication contains geographic location information sent to at least one receiver.

The method can also communicate information comprising: sending an anonymous communication from the said at least one submitter, from at least one user-interface of at least one input device, connected to at least one of the Internet, a virtual network, a communication network, social network, world wide web, WAN, and/or LAN, wherein said anonymous communication contains information, wherein the anonymous communication sent from the at least one submitter is inputted utilizing at least one customized standardized template with a drop-down list for selecting at least one recipient; receiving, by the said input device, a selection of the said at least one recipient from the drop-down list within the standardized template; sending the at least one Unique Identifier, and any non-encrypted information or message to the at least one receiver of the plurality of receivers.

The method may also include wherein a customized standardized template drop-down list comprises at least one of the following: recipient, priority level, type of incident, building, location, GPS location or other.

The method can additionally comprise of the steps of the said customized standardized template includes a choice for setting the level of priority that can be assigned to the communication, the level is one of "Urgent", "High", "Medium", "Normal", "Low", or other.

The method further may comprise of wherein the said standardized template includes a drop-down list for selecting a type of communication, said types of communication comprising of at least one of stress, family, issues, harassment, stealing, drugs, bullying, weapons on campus, bomb threats, cheating on schoolwork, cutting/self-injury, cyber bullying, fighting, gang related issues and/or associations, peer pressure, sexual harassment, and/or depression, trafficking, accident, standards, regulations, or other customized type of communication.

The method may further comprise, wherein the said standardized template includes a drop-down list for selecting a types of location, said types of location comprising bus, cafeteria/lunchroom, classroom, hallway, auditorium, gymnasium, locker room, street, sidewalk, playground, bathroom, in town, sports field, Face book, instant messaging, face time, social media, imessage, e-mail, instant message, Twitter, telephone, Skype, IP (internet protocol) address, VoIP (Voice over Internet Protocol), a multimedia message (MMS), YouTube or other customized type of location.

The method may further comprise of, wherein the communication language can be selected by the submitter from a choice of, or drop down window displaying, a selection of a variety of languages to pick from to read and/or communicate in and the at least one receiver through the computer implemented method has the ability to select auto translation of the information.

The method may further comprise of, whereby any information can be submitted or received on at least one of a mobile device, mobile phone, computer, smart pad, electronic device, input device, user-interface, communication device, fax, facsimile machine, phone, voice prompt, tablet, and/or smart device and/or communication sent comprises at least one of the following an image, photo, text, video, film, sound file, sound bites, audio, content file, downloadable content, downloadable file utilizing a Unique Identifier with said message and/or information.

The method may further comprise of the steps of prior to sending an anonymous communication from the at least one submitter, downloading and/or activating an icon on at least one of a computer, mobile device, Mobil phone, smart pad, electronic device, smart watch, smart glasses, car play and alike, input device, communication device, touchscreen computing device, portable media player, smart device, or tablet to provide an activated application and open a log-in screen; inputting a unique code identifier "UCI" on the log-in screen wherein the unique code identifier "UCI" identifies which community the anonymous submitter(s) wants to communicate with or is located in or near; and submitting the UCI to authorized person(s) and/or administrator(s) to disseminate the UCI with-in the community and surrounding areas so the UCI can be utilized by submitter person(s) and/or groups(s) in or near the community for sending anonymous communications to a specified authorized receiver(s) or receiver group(s).

The method may further comprise of, wherein the at least one of a user-interface and/or a input device is comprised of a computer, mobile device, Mobil phone, smart pad, electronic device, smart watch, smart glasses, car play and alike, input device, communication device, touchscreen computing device, portable media player, smart device, tablet, voice prompt, phone, fax, facsimile, a part therein and/or associated software, further comprising the steps of: locating the submitter(s) using a geographic locater, device identifier, and/or global positioning system (GPS); and providing the submitter's location to a host system for submission to receiver(s).

The method may further comprise of, wherein the geographic locater is sending and/or transmitting to/from the submitter's, receiver's, and/or the administrator's mobile device.

The method may further comprise of: downloading, accessing, utilizing and/or activating an application to send, mood related, time sensitive, or secretive information, sending an anonymous communication, said anonymous communication containing information; encrypting the information, in part or in whole; routing the encrypted information and any other information to be sent to at least one receiver; generating at least one Unique Identifier; and sending the at least one Unique Identifier and at least one confirmation message to the at least one submitter, and sending the at least one Unique Identifier, and any non-encrypted information to the at least one receiver.

The method may also further comprise of the steps of: the system receiving at least one selection command, voice activated or other content input or transmission from the submitter; the submitter typing in a message/information and/or selecting a photo/camera function/image/text/film/audio/file/content/sound or video to upload to the system; and the submitter, after sending a submission/communication, receiving a communication comprising a Unique Identifier and a message confirmation.

The invention may be comprised of non-transitory storage device storing a plurality of instructions for at least one message submitter to send in, one-click, one-step, mood related, time sensitive, medical, threatening, or secretive information, wherein said non-transitory storage device comprises a plurality of instructions for: sending an anonymous communication from the said at least one submitter, from at least one user-interface of at least one input device, connected to at least one of an Internet, a virtual network, a social network, a world wide web, WAN, and/or LAN, wherein said anonymous communication contains information; encrypting the information, in part or in whole; submitting the encrypted information and any other information to be sent to at least one receiver of a plurality of receivers; generating at least one Unique Identifier, and sending the at least one Unique Identifier and at least one confirmation message to the at least one submitter, sending the at least one Unique Identifier and any non-encrypted information to the at least one receiver of a plurality of receivers, wherein the instructions further comprise a step, when the submitter chooses to only be identified as being anonymous, the submitter completing the anonymous e-mail address and/or text number entry field in the confirmation message; sending the confirmation message to at least one receiver of the plurality of receivers, wherein the submitter communication is identified as being anonymous; sending, by the at least one receiver of the plurality of receivers, at least one response message anonymously back to the submitter in response to or associated with the at least one Unique Identifier, wherein the at least one receiver of the plurality of receivers is a targeted receiver for the communication; storing the non-encrypted information in at least one database; matching the targeted receiver to a specific communication and information targeted by the submitter associated to at least one Unique Identifier stored in the database; providing a Receiver Unique Identifier to a host system administration device, system administration device and to each receiver; granting the targeted receiver access to the secure communication and information targeted by the submitter for the targeted receiver once the inputted Receiver Unique Identifier is verified; wherein the targeted receiver is permitted to open communication(s), read the communication(s), act on the communication(s), forward the communication(s), respond to the communication(s), reply to the communication(s), and/or delete the communication(s) based on the inputted Receiver Unique Identifier.

The invention may additionally comprise of, wherein the instructions further comprise a step, when the submitter chooses to be identified as being non-anonymous, wherein the submitter may reveal information such as their name, e-mail address, phone number, phone text number, photo, video, audio, mobile or other device identifier, or network identity code or location for non-anonymous communications to the at least one receiver(s) and the information is stored in at least one data base, and the submitter communication is identified as being non-anonymous.

The invention may additionally comprise of: wherein the instructions further comprise a step, wherein at least one of the at least one receiver(s) is a targeted receiver(s) of the communication, and further comprising the steps of: matching at least one targeted receiver to specific communications and information stored in at least one database or other storage device and associated with at least one Unique Identifier; providing a Receiver Unique Identifier to a host system administration device, system administration device, and to each receiver; giving a receiver access to secure communications and information targeted by submitter to them once they input their Receiver Unique Identifier; and permitting the receiver to open communication(s), read the communication(s), act on the communication(s), forward the communication(s), respond to the communication(s), reply to the communication(s), and/or delete the communication(s).

The invention can be comprised of a computer implemented method for reporting at least one live incident in real-time comprising at least one or more of the following steps: accessing a Smart Button area on the display of a computer, mobile device and/or smart device, wherein Smart Button activation is initiated with at least one user interface, mouse click, physically pressing a predefined screen area and/or gesture recognition; submitter optionally enters or edits data, identity information and/or incident information or report; the submitter decides the degree of anonymity to select when accessing/activating use of a smart button from at least one user-interface of at least one input device, connected to at least one of an Internet, a virtual network, a social network, a world wide web, WAN, and/or LAN, said anonymous communication contains information; said activation/accessing of Smart Button causes device to be located and/or automatically enabled to be located employing at least one of GPS, proximity to at least one cell tower, proximity to at least one WiFi and/or other signal, establishing prior known location and/or association with at least one known location; said activation further initiating at least one of the following steps: generating at least one Unique Identifier associated with the submitted incident event and/or information; capturing accessing or generating at least one Unique Identifier for the device sending the incident report; creating, accessing, and/or utilizing at least one Receiver Unique Identifier associated with at least one individual to be contacted; generation of at least one custom incident or event report and location to at least one receiver(s) with at least one Receiver Unique Identifier; accessing, inputting and/or submitting at least one custom standardized template the user can enter and/or select from dropdown menu at least one of their incident or event details, name, e-mail address, phone number, school or organization, photo, audio, video, alias, or other identifying information associated with the user, or take no action or choose to skip; typing a custom message within a data entry field within a template; manually turning on GPS location services if not currently available with one click and/or interaction with a touchscreen; adding user's picture and save and transmit if user does not want to be anonymous; creating reports for at least one administrator and/or authorized receiver(s); notification from submitter to authorized receiver(s) sent via text, email, voice and/or push mobile notification; location of at least one submitter on at least one map.

The method may additionally comprise of, creation, access, utilizing, of a group to be displayed within a drop down menu and/or list comprising at least one authorized person to be contacted.

The method may additionally comprise of, wherein said at least one standardized customized template includes a dropdown list for selecting at least one type of event or incident communication.

The method may additionally comprise of, a step wherein at least one administrator or receiver can view or access a report a map, graph, table will be displayed with the GPS location of at least one submitter.

The method may additionally comprise of, further comprising the emitting of a custom sound, light, vibration to be received and acted upon by receiver.

The method may additionally comprise of, a step whereby the location of at least submitter is tracked using at least one map locator.

The method may additionally comprise of, wherein said at least one standardized customized template includes a drop-down list and/or other selectable switch, button, or interface for at least one submitter sending or displaying Incident Report, Glossary, Help, Notification, Smart Button.

The method may additionally comprise of, said Notification is the receipt through the device of push notifications and other information relating to among other things counseling, time sensitive or goodwill messages to submitter(s).

The method may additionally comprise of, wherby the Anonymous communication(s) are carried forth via at least one of the following: 2-way text-to-cell communication, 2-way voice communication, 2-way Social Media communications, 2-way texting, 2-way phone, 2-way SMS or MMS, 2-way communication, about information, and the 2-way communication is between the sender/submitter(s) and the receiver(s).

The method may additionally comprise of, that the at least one receiver can send at least one response message back to the at least one submitter in response to the unique identifier and related content received by receiver(s) from the submitter(s).

The method may additionally comprise of, wherein the at least one submitter may submit information as at least one message via at least one user-interface using at least one standardized template on at least one of a mobile device, smart pad, electronic device, mobile phone, input device, communication device, tablet, computer, fax, facsimile machine, phone, smart device and/or smart phone The method may additionally comprise of, wherein the unique identifier is generated using at least one unique algorithm.

The method may additionally comprise of, wherein the instructions further comprise a step, wherein the unique identifier is generated using at least one unique algorithm.

The method may additionally comprise of, wherein said application(s) are native applications specific to the device being used.

The method may additionally comprise of, wherein the at least one submitter may submit information as at least one message via at least one user-interface using at least one standardized template on at least one of a mobile device, smart pad, electronic device, mobile phone, input device, communication device, tablet, computer, fax, facsimile machine, phone, smart device and/or smart phone.

The method may additionally comprise of, wherein the instructions further comprise a step of using at least one customized standardized template(s), wherein the communication being sent from the at least one submitter is input utilizing at least one of the system and method's customized standardized template(s).

The method may additionally comprise of, instructions for having a data base, and icon capable of communicating said submitter message to said data server using unique identifier.

Although preferred embodiments of the present invention have been described it will be understood by those skilled in the art that the present invention should not be limited to the described preferred embodiments. Rather, various changes and modifications can be made within the spirit and scope of the present invention.

BRIEF DESCRIPTION OF THE SEVERAL VIEWS OF THE DRAWING

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a schematic view of the operation of the system for receiving and responding to mood related or time-sensitive or secretive information, content, and/or messages.

FIG. 2 depicts the flow of creating a new anonymous/non-anonymous mood related or time-sensitive or secretive message for submission.

FIG. 2A—screen shot of photo upload screen, 64 choose file, 59 upload button.

FIG. 2B—screen shot of Selecting the image, depicts the selection of an image or other content or text to upload; 68 selects picture to upload.

FIG. 2C—screen shot of uploading an image.

FIG. 2D—screen shot of cropping an image, with crop button 67, and submit/cancel 61.

FIG. 2E—depicts a smartphone with the Anonymous Alerts Icon. Submitter clicks the mobile application icon to startup/initiate mobile application.

FIG. 2F—depicts the log-in screen of the mobile application for Anonymous Alerts where a Submitter enters a unique Code Identifier "UCI" and password to activate Community View and submit anonymous messages to authorized Receiver(s)/Recipient(s). The Unique Code Identifier "UCI" functions for use in identifying the community and acts as a location finder to quickly identify which community the anonymous submitter wants to communicate with or is located in or near. This UCI is usually submitted to Authorized Persons and/or administrators to disseminate within the community and surrounding areas so the UCI can be utilized by Person(s) and/or Groups(s) in or near the community for sending anonymous communications. The UCI joins together the Submitter with the target Receiver(s). Based on the UCI the submitter is able to send anonymous messages to a specified and authorized Receiver(s) or Receiver group(s). The UCI can determine or establish the permissions for locating a specific community and its location.

FIG. 2G—submitter message submission screen wherein the Submitter chooses to select "Send Incident Report" or "Glossary" to access definition of terms or "Help".

FIG. 2H—submitter message submission screen after the Submitter chooses to select "Send Incident Report", which includes several entry fields, a message field, and submit or send button.

FIG. 2I—submitter message submission screen after the Submitter chooses to select "Send Incident Report" which includes several entry fields and Submitter can select location with a picker that is data driven with custom locations.

FIG. 2J—submitter message submission screen after the Submitter chooses to select "Send Incident Report" which includes several entry fields including an anonymous message screen.

FIGS. 2K and 2L—submitter is prompted to upload an image (upload, or take picture then upload) at the Submitter's discretion if the Submitter has an image to upload about an incident report or other message/information. Various choice options are shown.

FIG. 2M confirmation screen showing that image or other content has been successfully uploaded.

FIGS. 2N and 2O—mobile Application Screens—sending at least one unique identifier and at least one confirmation message to at least one submitter, and sending at least one unique identifier, and any non-encrypted information to at least one receiver. The submitter can choose to remain anonymous, send the anonymous e-mail address and/or text number in the entry field in the confirmation message, then submit this information to be encrypted and stored. Alternatively, the submitter can choose to be non-anonymous, and reveal information such as the Submitter's name, e-mail address, phone number, phone text number or network identity code or location for non-anonymous communications.

FIG. 2P—depicts "Glossary of Terms" screen. Can include community-specific customized terms.

FIG. 2Q—screen for "Definition of Terms" in the drop down menus.

FIG. 2R—help Screen on mobile device.

FIG. 2S—screen Shot of Receiver's smart phone device depicting a message being received from an anonymous Submitter.

FIG. 3 depicts the Message Submitter flow of automated operations that occur following the creation and submission of an anonymous/non-anonymous alert message.

FIG. 4 depicts the flow of an Administrative User's Account Setup process for a message recipient.

FIG. 5 depicts the flow of how a message Receiver or recipient accesses a message from the administrative interface.

FIG. 6A depicts option 1 when viewing new sensitive content message with ability to forward message via e-mail to another party.

FIG. 6B depicts option 2 when viewing new message for Message Recipient to reply to Message Submitter.

FIG. 7 is a screenshot of a system where an Administrator can setup a user account.

FIG. 8 is a screenshot of the possible types of alerts for an anonymous/non-anonymous alert report.

FIG. 9 is a screenshot of system query results that a Message Recipient may search.

FIG. 10 is a screenshot of a message screen containing an original message, related message history, and reply/forwarding options by an administrative user.

FIG. 11 is a screenshot of a reply screen for an administrative user.

FIG. 12 is a screenshot of an example of the Message Submitter's User Interface.

FIG. 13 is a screenshot of an example of the Message Submitter's message type drop-down list options.

FIG. 14 is a screenshot of an example of the Message Submitter's person of contact drop-down selection options.

FIG. 15 is a screenshot of a confirmation that the Message Submitter's submission was received.

FIG. 16 depicts an example of a mobile or smart phone screen having a downloaded application of the method of the invention.

FIG. 21 shows a Mobile Phone displaying the Smart Button and anonymous incident reporting and locator mobile application screens.

DETAILED DESCRIPTION OF THE INVENTION

Figure 17:
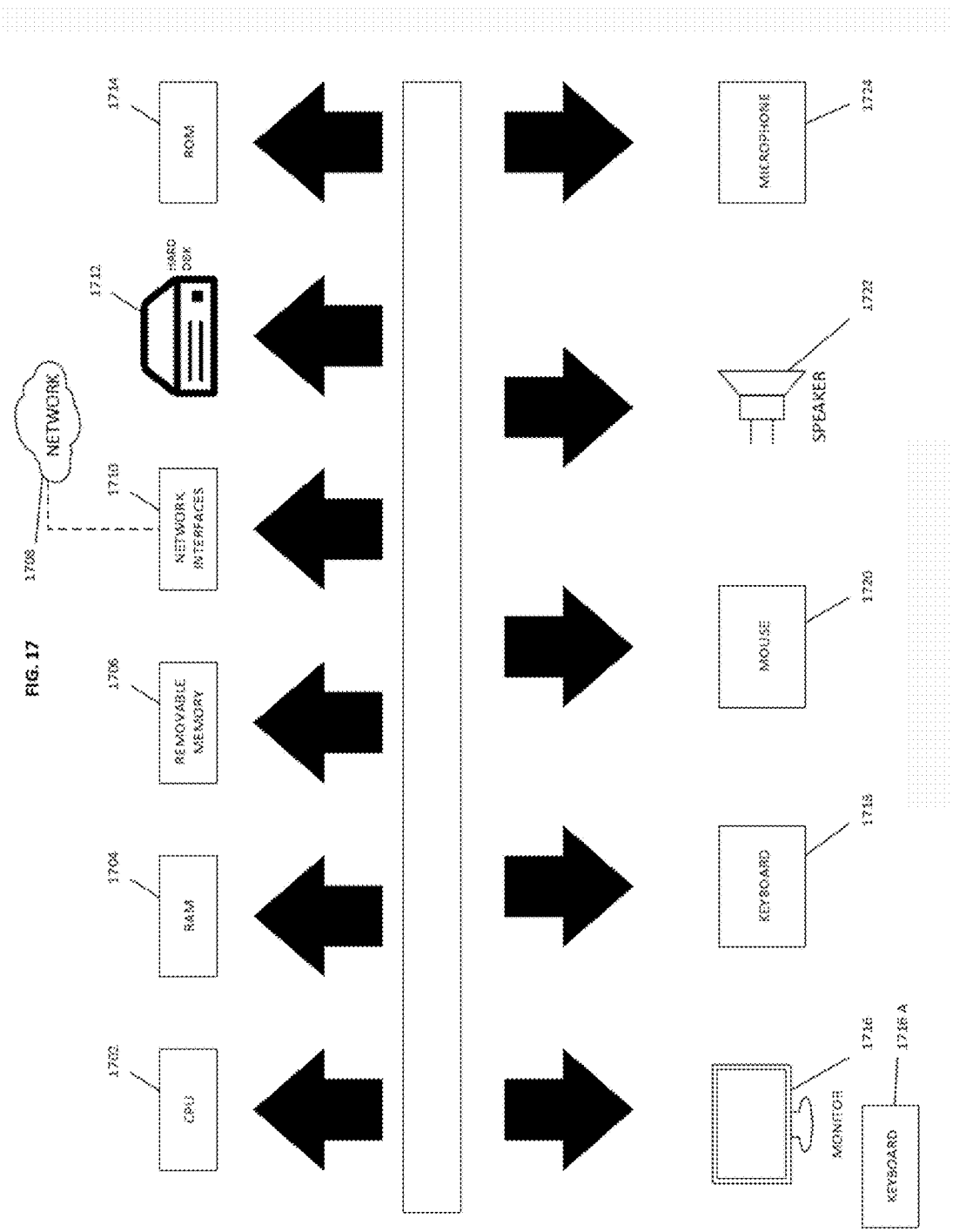
FIG. 17 is an exemplary information handling system in accordance with an embodiment of the present invention.

Detailed descriptions of particular embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The basic components of the system for receiving and responding to mood related or time-sensitive content matter messages in accordance with the invention are illustrated by FIG. 1. The system 37 includes a server 15 (and 540), that is accessible by Submitter(s) comprising of at least one student(s) 1, parent(s) 3, staff/authorized parties 6, residents/community members 9 of the community, and/or other Submitter(s) 7 via a network that is connected to the Internet, world wide web, any virtual network, a WAN (wide-area network), and/or LAN (local-area network). The server 15 (and 540) is connected to at least one of the databases 18, in conjunction with 21, which uniquely identifies content, messages, identity information, and information/content data 12 and matches the submission to the authorized receiving party(s) designated to receive the submission. The database 18 enables encryption of the identity and/or content data and generates a Content Unique Identifier 22 for the Submitter identifying content so that it is anonymously sent to the intended recipient(s). The system 37 is anchored through the Internet, a virtual network, WAN and/or LAN and is, thus, accessible by personal computer, PDA, tablet, smartphone, mobile device, or other device with Internet, virtual network, WAN, and/or LAN connectivity.

Similarly depicted by FIG. 1, the system 37 is also accessible via the Internet, a virtual network, WAN, and/or LAN by authorized person(s)/receiver(s) such as school superintendent 27, principal 30, counselor 33, law enforcement official(s) 36, and/or other receiver(s) 34. Because of the inventive network's use of the Internet, a virtual network, WAN, and/or LAN, this information is accessible to administrators via personal computer, PDA, mobile device, smart phone, tablet, or other device with Internet, a virtual network, WAN, and/or LAN connectivity. As a result of this accessibility, school administrators and other personnel are able to access messages, by log-in using Receiver Unique Identifier 20 which is verified by Host Administration Device 21, to which they are an intended recipient, and communicate with the submitting party, or forward the received message to other parties via e-mail, text, and/or other communication methods.

Depicted in FIG. 2 is the system's 37 accessibility via the cloud 39 (and 530), which can be any or all of the following: the Internet, a virtual network, social network, world wide web, WAN, and/or LAN.

Referring to FIG. 2, an embodiment of a Message Submitter screen 1 is shown. In the embodiment of FIG. 2, a person who would like to submit a message ("Message Submitter" or "Submitter") may optionally select to download a smart device application by clicking or selecting the application icon located on screen 1, 53, and continue the process from the smart device or continue on screen 1 by first selecting the message window 42 from the designated website or application, optionally selecting from the language choices available 43 (The current default is English), and then will select and identify the Person(s)/receiver(s) to Contact 45 to receive the message from a drop-down menu. The Message Submitter may then select a level of priority 48. While the default level in the current embodiment is set to "Normal", a Submitter may indicate that the content of the message is of "High Priority" or one of the other choices being offered. The Submitter may then select a particular Message Type "incident type" 51, which is the character of the message they are sending from the options provided in the drop-down selection (i.e., Bullying, Peer pressure, bomb threat, other school threat, etc.). Submitter also may choose School building type 44, and location there within 52, and a Message Submitter will type a free-form message 54. This embodiment allows for a free-form message. Then the submitter may select a request by checking the box or other indication to add other content to the submission comprising images, text, photos, video, film, sound bites, or other content 56. Lastly, the Submitter would click the graphic icon "1-Step Submit" 57 to submit the message to the receiving and/or corresponding party via a one-click submission process.

FIGS. 2A-D are screen shots dealing with selecting and manipulating images to be sent. The Message Submitter if desired can alternatively and choose at least one file, 64, (FIG. 2B Choice screen appears for selecting) than select to upload or cancel 59, at least one photo or other content/data from a computer, tablet, smartphone, etc. with or without text. Additionally, the photo can be uploaded from an app, a library, or a photo taken by a phone, tablet or similar device, with the submission comprising images, text, photos, video, film, sound bites, or other content. FIG. 2D shows the ability to make adjustments such as cropping 67 to the selected content prior to submission. To submit, select Submit 61.

FIG. 2E—Depicts a smartphone with the Anonymous Alerts Icon. Submitter clicks the mobile application icon to startup/initiate mobile application.

FIG. 2F—Depicts the log-in screen of the mobile application for Anonymous Alerts where a Submitter enters a unique Code Identifier "UCI" and password to activate Community View and submit anonymous messages to authorized Receiver(s)/Recipient(s). The Unique Code Identifier "UCI" functions for use in identifying the community and acts as a location finder to quickly identify which community the anonymous submitter wants to communicate with or is located in or near. This UCI is usually submitted to Authorized Persons and/or administrators to disseminate within the community and surrounding areas so the UCI can be utilized by Person(s) and/or Groups(s) in or near the community for sending anonymous communications. The UCI joins together the Submitter with the target Receiver(s). Based on the UCI the submitter is able to send anonymous messages to a specified and authorized Receiver(s) or Receiver group(s). The UCI can determine or establish the permissions for locating a specific community and its location.

FIG. 2G shows the Submitter message submission screen wherein the Submitter chooses to select "Send Incident Report" or "Glossary" to access definition of terms or "Help".

FIG. 2H shows the Submitter message submission screen after the Submitter chooses to select "Send Incident Report" which includes several entry fields, message field, and submit or send button.

FIG. 2I shows the Submitter message submission screen after the Submitter chooses to select "Send Incident Report" which includes several entry fields and Submitter can select location with a picker that is data driven with custom locations.

FIG. 2J shows the Submitter message submission screen after the Submitter chooses to select "Send Incident Report" which includes several entry fields including an anonymous message screen.

FIGS. 2K and 2L show how the Submitter is prompted to upload an image (upload, or take picture then upload) at the Submitter's discretion if the Submitter has an image to upload about an incident report or other message/information. Various choice options are shown.

FIG. 2M shows a confirmation screen showing that image or other content has been successfully uploaded.

FIGS. 2N and 2O show Mobile Application Screens, sending at least one unique identifier and at least one confirmation message to at least one submitter, and sending at least one unique identifier, and any non-encrypted information to at least one receiver. The submitter can choose to remain anonymous, send the anonymous e-mail address and/or text number in the entry field in the confirmation message, then submit this information to be encrypted and stored. Alternatively, the submitter can choose to be non-anonymous, and reveal information such as the Submitter's name, e-mail address, phone number, phone text number or network identity code or location for non-anonymous communications.

FIG. 2P depicts a "Glossary of Terms" screen. This can include community-specific customized terms.

FIG. 2Q shows the screen for "Definition of Terms" in the drop down menus.

FIG. 2R shows a help screen on mobile device.

FIG. 2S shows a screen shot of Receiver's smart phone device depicting a message being received from an anonymous Submitter.

After activating an icon on at least one of a computer, mobile device, smart device, or tablet the Submitter enters in a login screen of the application, information including a unique code identifier "UCI". The Unique Code Identifier "UCI" functions for use in identifying the community and acts as a location finder to quickly identify which community the anonymous submitter wants to communicate with or is located in or near. This UCI is usually submitted to Authorized Persons and/or administrators to disseminate within the community and surrounding areas so the UCI can be utilized by Person(s) and/or Groups(s) in or near the community for sending anonymous communications. The UCI joins together the Submitter with the target Receiver(s). Based on the UCI the submitter is able to send anonymous messages to a specified and authorized Receiver(s) or Receiver group(s). The UCI can determine or establish the permissions for locating a specific community and its location.

As shown in FIG. 3, once a Message Submitter has submitted an alert via the "1-Step Submit" 57 process shown in FIG. 2, the Submitter will receive a notification note and confirmation 60 from the system 37. The system 37 will also generate a unique identifier 63 as depicted by the screenshot in FIG. 15 (the current preferred mode is 5 digits, but any number of digits, letters, symbols or combinations thereof can be used). This unique identifier can be used when contacting the school via telephone or any other transmission method in order to reference the message that was submitted without revealing the Submitter's identity. The system will also permit the Message Submitter to provide an e-mail to which the school may choose to reply 66. The system will automatically encrypt the e-mail address submitted to the school in order to maintain the Submitter's anonymity. Should the Message Submitter elect to be non-anonymous and provide an e-mail and/or other details, the Submitter simply enters the address and/or other information in the non-anonymous section and clicks "submit" 69. The system can guarantee no IP (internet protocol) address tracking for additional security for a group or community that chooses or prefers the highest level of anonymous protection or the method can provide IP addresses as part of the process or when a direct threat has been launched through the system 37. The system 37 can guarantee no IP (internet protocol) address and no VoIP (Voice over Internet Protocol) tracking for additional security for a group or community that chooses or prefers the highest level of anonymous protection or the method can provide IP and/or VoIP addresses as part of the process or when a direct threat has been launched through the system.

Figure 7:
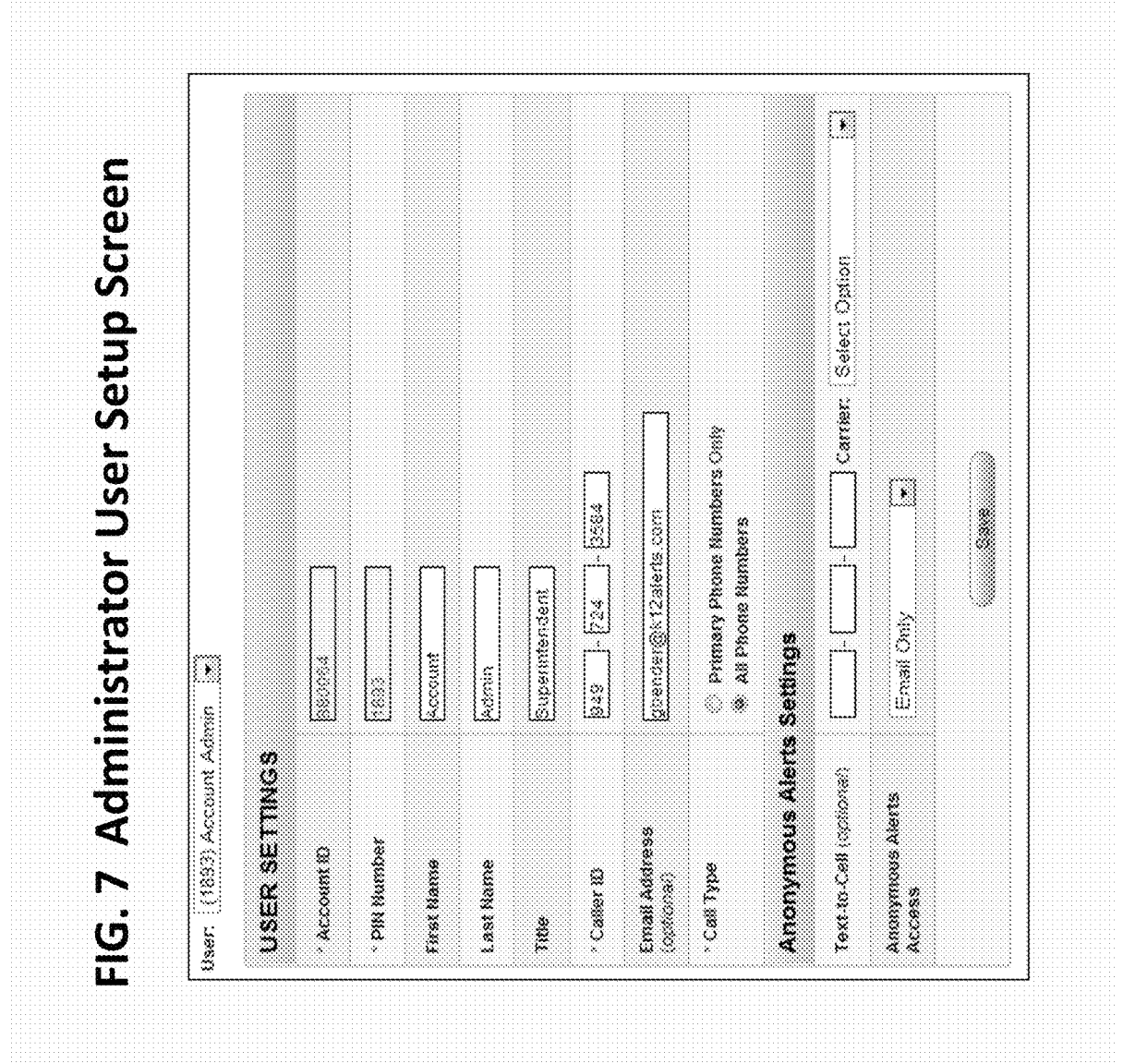

As described in FIG. 4 and depicted in the screenshot of FIG. 7, a system administrator (admin) 550 must first create an account for a content Message Recipient (i.e.: receiver/ Authorized party). Thus, the admin 550 must first log into the system to access the admin's account, such access to the admin's account can be through use of a mobile or other smart device application by selecting the icon located on the mobile and/or smart device, or login screen 72, or can be through any of a computer, smartphone, mobile phone, mobile device, Internet accessible device. To create a new account, an admin 550 selects the "Account" option on the menu bar 75 and fills in the requisite information, comprising first and last name of the new user 78, may enter title, the type of notification the admin 550 may wish to receive from the system 37 (e-mail, text, voice, instant message, reports only, social media notification or all) 81, and the new user's corresponding contact information including e-mail addresses, and any relevant phone numbers 84. Once an account has been created, a Message Recipient (Receiver) can access anonymous/non-anonymous alert messages by logging into the system Account 87 as described in FIG. 5. From here, the user can run a query for anonymous/non-anonymous alerts from the Campaign Track or reporting system on a menu 90, and identify a date range, and message type 93. The system will run the query 96 and the Recipient/ admin 550 user can select to either 1) Open message, 2) Reply to message, 3) Forward message, or 4) Delete message, all options depicted in 99. Should the user choose to open a new message 108 as shown in FIG. 6A, the user will be able to access that particular message, as well as view its message history with time stamped information 102, as depicted in FIG. 6A. The receiver may also elect to forward a message via e-mail to another party 105 before or after opening the message. Should the Receiver choose to reply to a message 111, the system 37 will open a new window 114 and permit a response to the Submitter. The response is then submitted through a "1-Step Submit" or "Submit" (one-click submit) process 117. The method and system of the invention thus allows for an unlimited number of recipients/ Receivers to instantly receive information on mood related, time sensitive or secretive, medical, and/or threatening issues.

Figure 10:
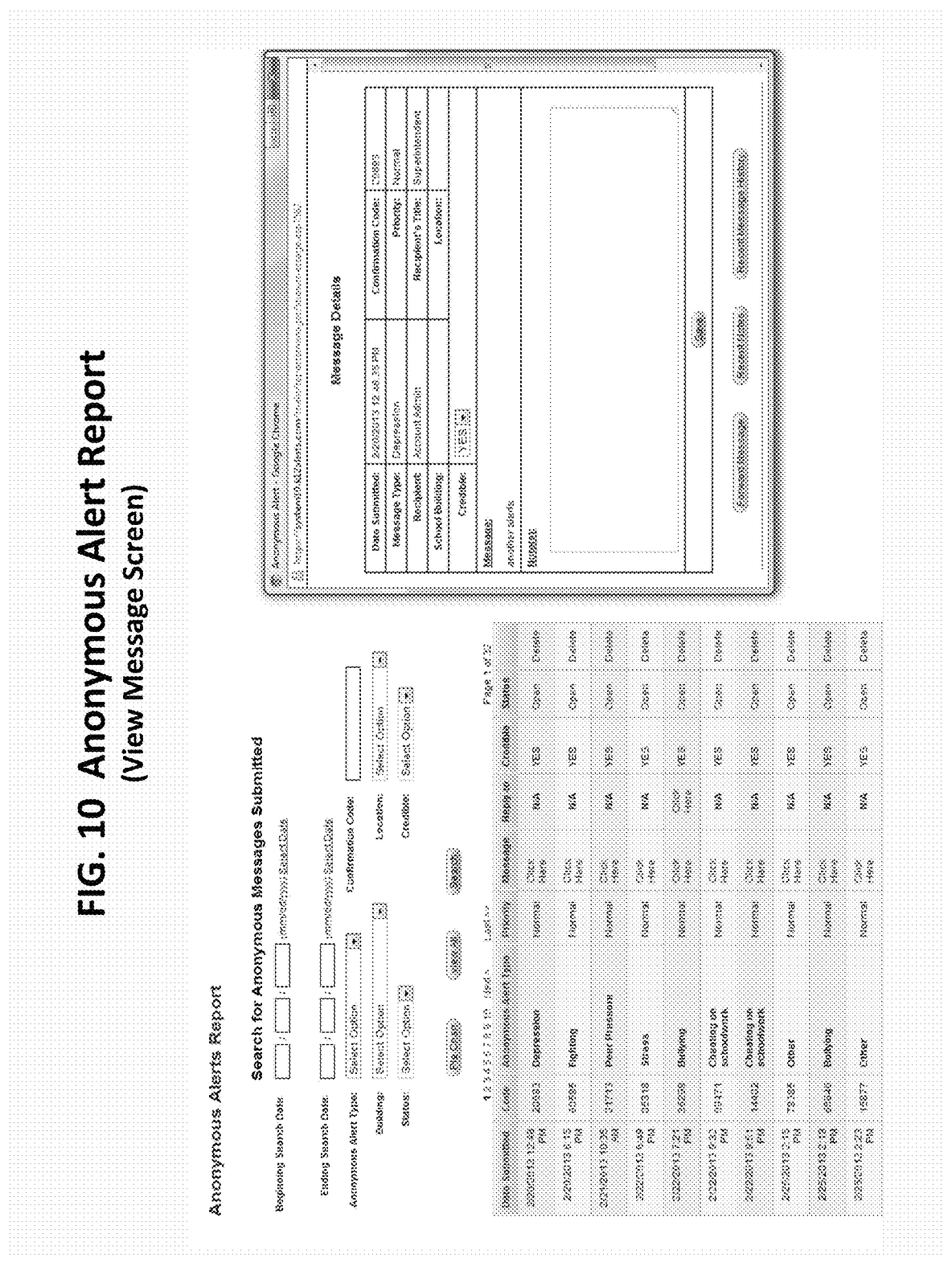

Referring to FIGS. 8-11, a Receiver who would like to view message content of various types, or those submitted during a particular time period, may do so through the system's 37 search options. FIG. 8 shows both the system's 37 date limitation options for a search query, as well as its options to refine a search by content message type through category selections available in the drop-down list provided. Once a query has yielded a set of results, (see FIG. 9) a user may select any particular message and its history and either read, reply, delete, or forward the information to another party. The results can also be displayed in a graphical pie chart format. FIG. 10 is a screenshot of a message screen containing an original message, related message history, and reply/forwarding options by an administrative user. FIG. 11 is a screenshot of a reply screen for an administrative user.

Figure 12:
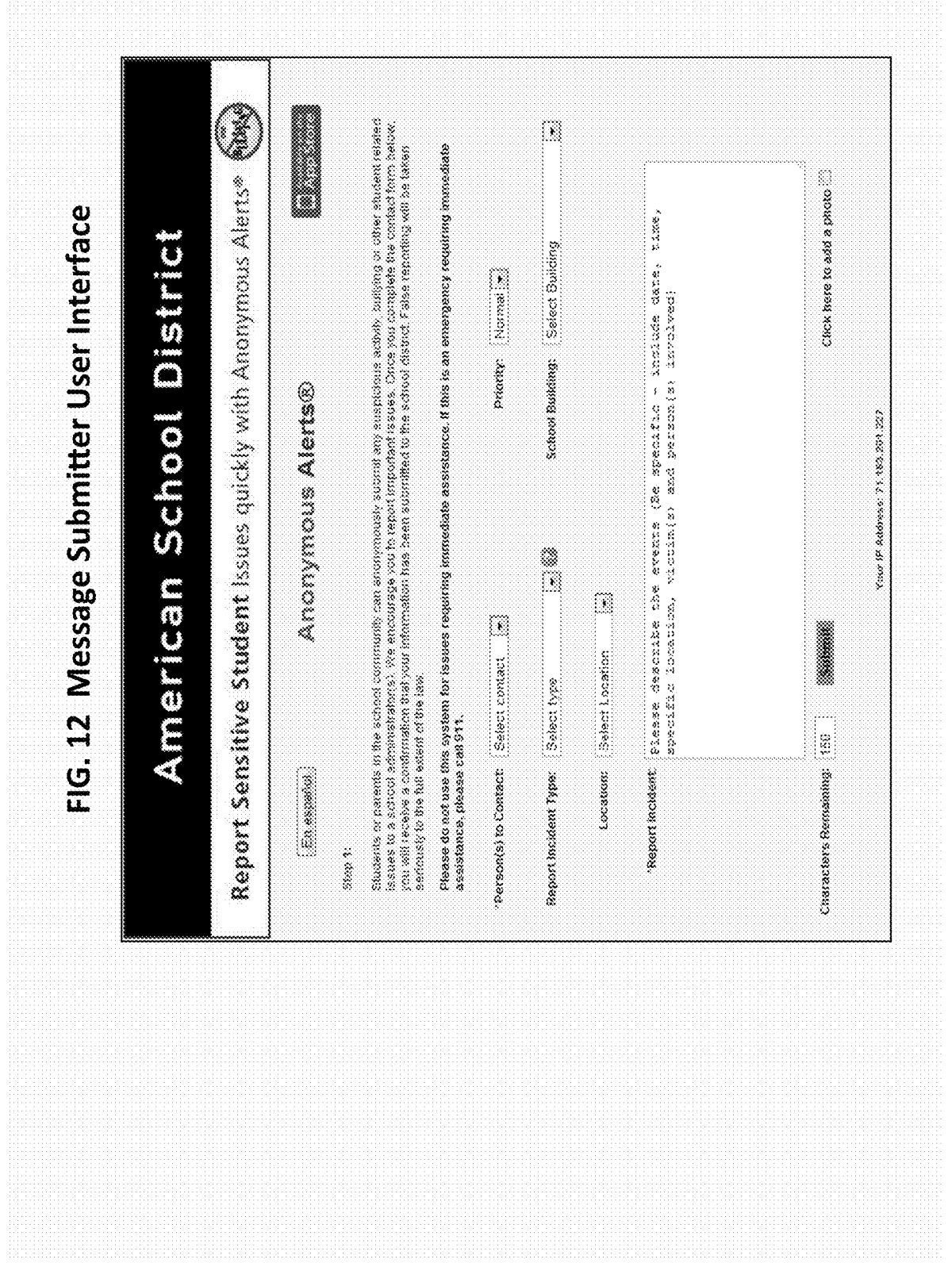
Figure 14:
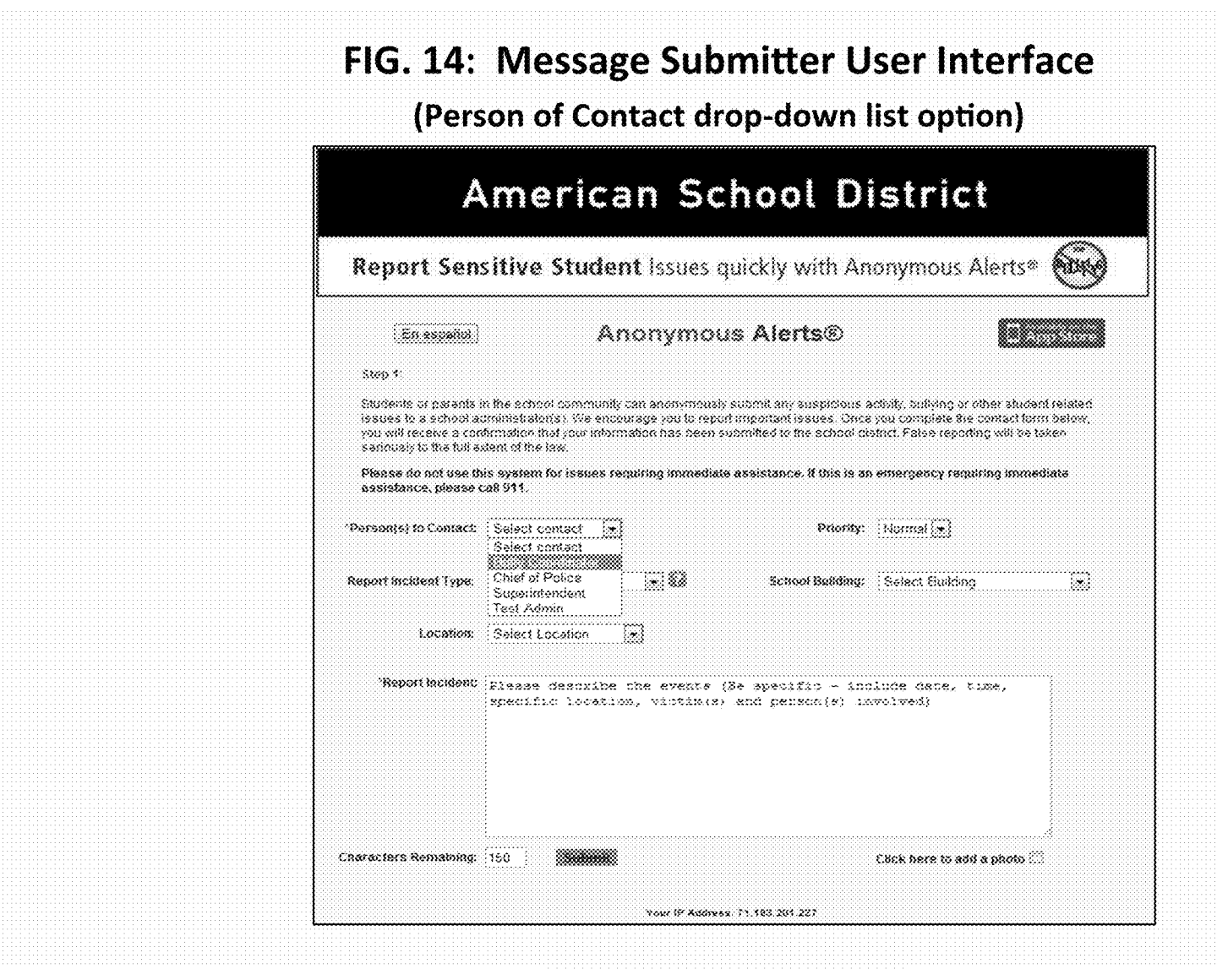
Figure 15:
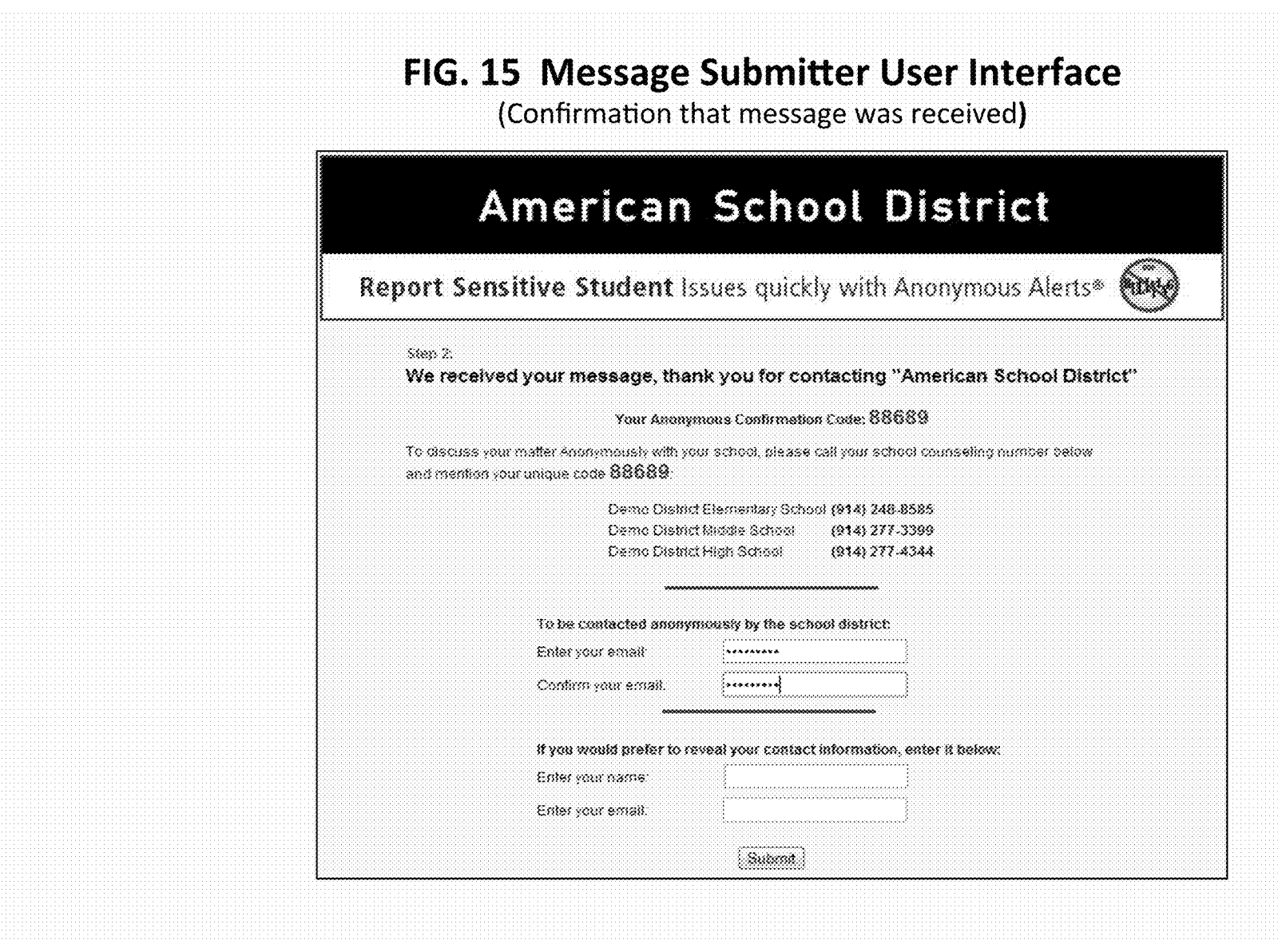

To submit a new anonymous/non-anonymous alert, a Message Submitter (or Submitter) must do so through the user interface or mobile application used in connection with the user interface. The template, as depicted in FIG. 12, has been simplified to include two required fields from drop-down lists: the Person of Contact field (FIG. 14), and the Message Type field (FIG. 13). The third field provides space for the body of the message. A character count is provided in the lower left hand corner of the template to increase the ease of use of the template. Once a message alert has been successfully submitted, the Submitter will automatically receive a notice confirming the submission. As depicted in FIG. 15, the confirmation notice includes an anonymous ID number as well as a corresponding telephone number should the Submitter wish to follow up on the Submitter's submission. Should the Submitter seek a response, the Submitter may also elect to provide an e-mail address or text number, which can be automatically encrypted by the system 37 in order to maintain the Submitter's anonymity, if desired.

FIG. 16 depicts an example of a mobile or smart phone screen having a downloaded application of the method of the invention.

FIG. 17 depicts an illustrated a block diagram of an exemplary information handling system. The information handling system comprises a bus that connects (either directly, or in combination with another bus) a Central Processing Unit (CPU, or processor) 1702 to RAM 1704, hard disc 1712, ROM 1714, and input/output devices. Additionally, the bus can have an interface for receiving removable memory 1706. Removable memory can include but is not limited to an optical disc, a memory card, or a "boot" drive. Additionally, the bus can connect the CPU 1702 to network interface(s) 1710. The network interface(s) 1710 can either physically or wirelessly connect the information handling system to one or more networks 1708, such as, but not limited to, the internet, WAN, and/or LAN, the Public System Telephone Network, a cellular telephone network, or a cellular data network.

Some inputs can include a mouse 1720, a keyboard 1718, and a microphone 1724. The output devices can include a screen 1716 and speaker(s) 1722. In certain embodiments, the screen 1716 can be heat or touch sensitive so as to project a visual keyboard 1716A for receiving inputs, thus not requiring a keyboard 1718 or mouse 1720.

According to certain embodiments of the present invention, the invention incorporates a plurality of instructions that are executable by the CPU 1702, residing in any combination of RAM 1704, Removable Memory 1706, hard disc 1712, or ROM 1714. Additionally, the instructions can reside at a node on the network. It will be understood that storage of said instructions in the node, RAM 1704, Removable Memory 1706, hard disc 1712, or ROM 1714 changes the foregoing, chemically, electrically, and/or electromagnetically.

Figure 18:
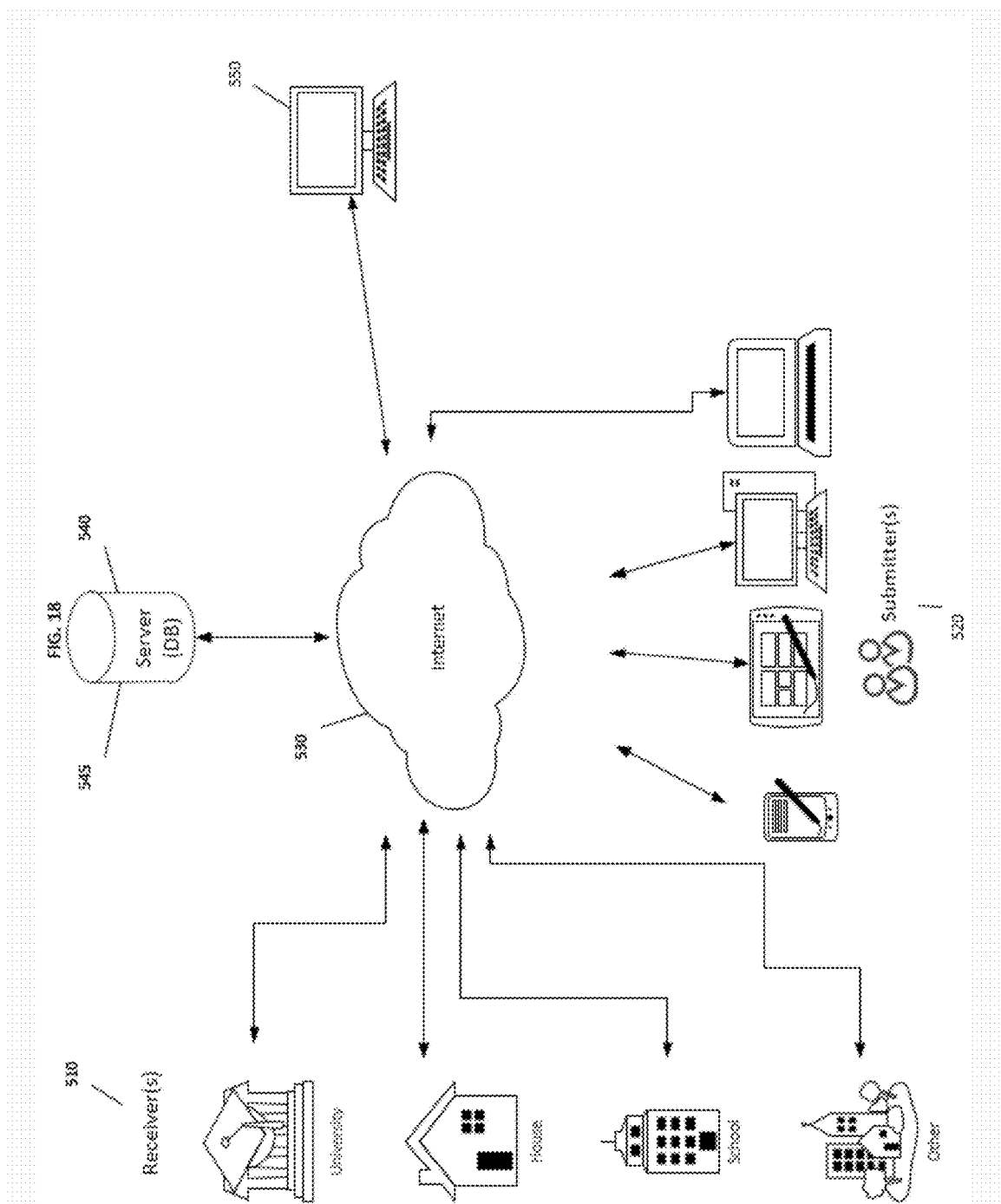
FIG. 18 depicts some of the Submitter and Receiver elements comprised in an embodiment of the present invention.

FIG. 18 depicts a typical system 37 enabling bi-directional connection via the cloud 530 (and 39) (which can be comprised of one of more of the following: the internet, a virtual network, social network, world wide web, WAN, and/or LAN) of a collection of Submitters 520 using devices such as a smart phone, tablet, computer, and laptop with a collection of Receivers 510 who are authorized persons located in places such as universities, houses, schools, and other places, and their bi-directional communication is enabled by at least one server 15 (and 540) housed in the host system for storing information in a data base 545 such as data identity, unique identifiers and other information used by the system administrator 550 as might be implemented in the present invention.

Figure 19:
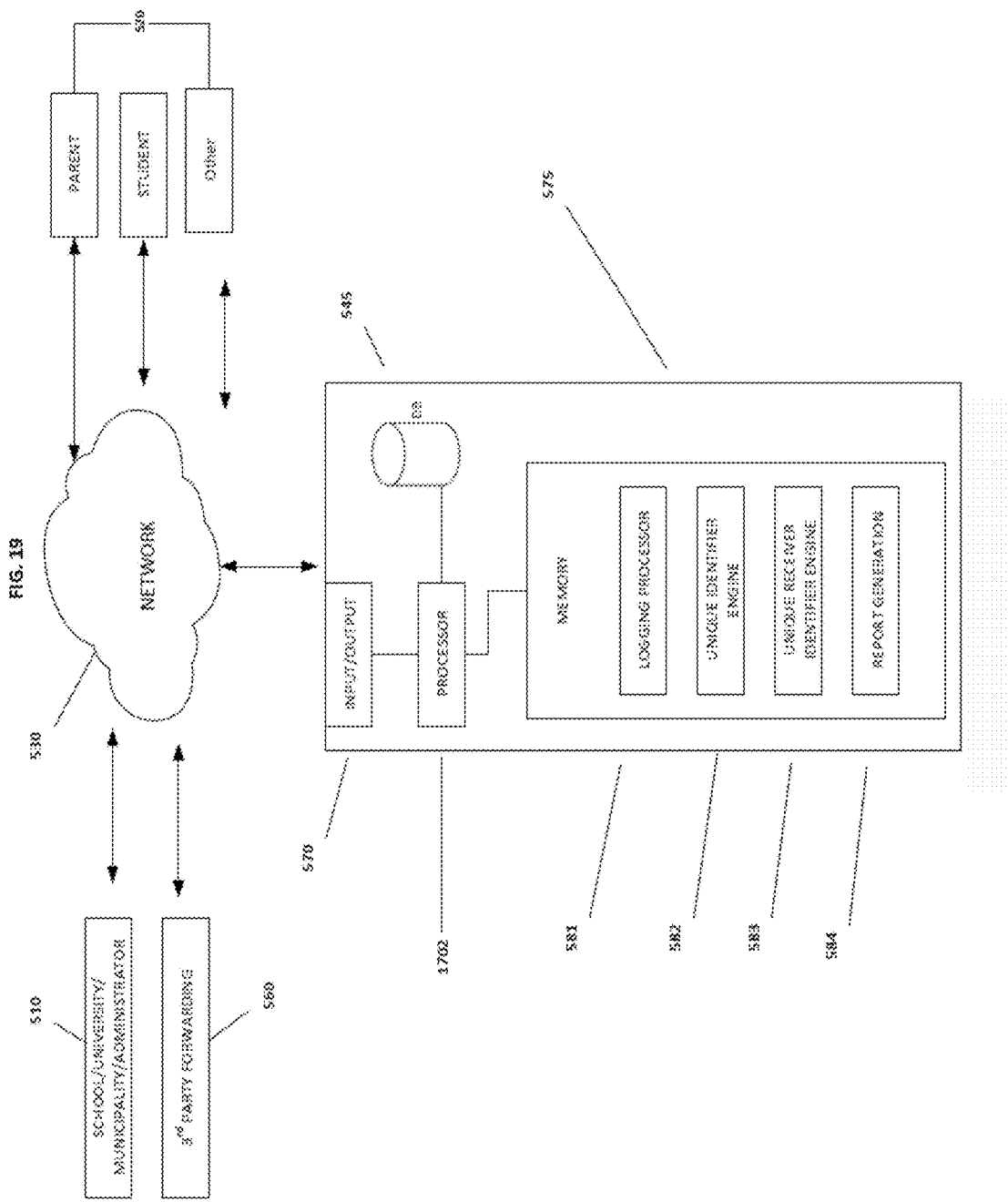
FIG. 19 is a system view showing the relationship between Submitter(s) and Receiver(s) and the intervening hardware, further depicting some of the steps performed in an embodiment of the present invention.

FIG. 19 is a system view showing the relationship within a cloud 530 (and 39) (which can be comprised of one of more of the following: the internet, a virtual network, social network, world wide web, WAN, and/or LAN) between Submitter(s) 520 which could consist of a parent 3, student 1, or other 7 and Receiver(s) 510 which could consist of a school, university, municipality, administrator, or 3rd party forwarding 560. In the server 15 (and 540) is depicted the input/output devices 570, processor 1702, data base 545, and collective memory 575 in which runs the logging processor 581, unique identifier engine 582, unique receiver identifier engine 583, and report generation 584. The logging processor 581 is unique login software that works in connection with the input devices and interfaces to set up communication between Receivers, Submitters, third parties, and administrators. The unique identifier engine 582 is unique software that generates Unique Identifier(s) using unique algorithms. The unique receiver identifier engine 583 utilizes unique software to generate a Receiver Unique Identifier. The report generator 584 is unique software designed to create unique reporting, charts, tables, lists, statistics, and/or data compilations about alerts and other information received and generated.

It is noted that community members can quickly submit content and information through a variety of transmission options (i.e., computer, fax, phone, smartphone, mobile phone, mobile device, smart device, Internet accessible device) to identified and selected parties who are authorized to respond and confront the issue(s) presented by the sensitive content of the message. The content selection screen is divided into fast and easy sections comprising person of contact, message priority, message type and message. Additionally, submission is advantageously reduced to a simplified, one-step process that creates ease of use for the members of the community for their submission of quick, immediate, and actionable content and code(s). The system can generate immediate feedback once a submission has been successfully sent, providing a code number identifying the particular claim(s) for reference purposes without compromising the anonymity of the Message Submitter. Encryption of the Sender ID can create a level of comfort in the anonymity it offers community members, students, parents, staff, and various community-member users. The content submitter can then choose to reveal their identity anytime thereafter. Additionally, the authorized Receiver(s) of the anonymous messages can have the option to furnish the individual Submitter with a response(s), forward the information to additional parties, and/or forward the information to subject matter experts.

The member transmission option can be to a download smart device application set to receive a particular group code which can insure the submitted content and information is routed to the selected group authorized and designated responder(s).

Additionally, the system can guarantee no IP tracking for additional security for a group or community that chooses or prefers the highest level of anonymous protection, or the method can provide IP addresses as part of the process or when a direct threat has been launched through the system.

Prior to sending an anonymous communication from at least one Submitter, Submitter may activate an icon on at least one of a computer, mobile device, smart device, or tablet. The Submitter can enter in log in screen of the application, information including a unique code identifier. After activating an icon on at least one of a computer, mobile device, smart device, or tablet, the Submitter can enter in a login screen of the application, information including a unique code identifier "UCI". The Unique Code Identifier "UCI" functions for use in identifying the community and act as a location finder to quickly identify which community the anonymous Submitter wants to communicate with or is located in or near. This UCI is usually submitted to Authorized Persons and/or administrators to disseminate within the community and surrounding areas so the UCI can be utilized by Person(s) and/or Groups(s) in or near the community for sending anonymous communications. The UCI joins together the Submitter with the target Receiver(s). Based on the UCI the submitter is able to send anonymous messages to a specified authorized Receiver(s) or Receiver group(s). The UCI can determine or establish the permissions for locating a specific community and its location.

Submitter can utilize the activated application to send, mood related, time sensitive, or secretive information, sending an anonymous communication, said anonymous communication containing information, encrypting the information, in part or in whole, routing the encrypted information and any other information to be sent to at least one Receiver, generating at least one unique identifier, and sending at least one unique identifier and at least one confirmation message to at least one submitter, and sending at least one unique identifier, and any non-encrypted information to at least one receiver. Submitter can receive a selection command from the Submitter/user, and said Submitter/user can type in a message and/or select a photo/image/sound or video to upload to the system receiving a unique identifier with message confirmation.

The Submitter can receive a selection command from the Submitter/user by clicking on an icon, and this icon appears on a user screen and enables the Submitter/user to type in a message and/or select a photo/image/sound or video to upload to the system receiving a unique identifier with message confirmation.

The user screen can be a mobile user device. The invention can include a data server, wherein an icon enables communication between a Submitter message and the data server using a unique identifier, and Submitter can be using a search module which is capable of searching the database.

Figure 20:
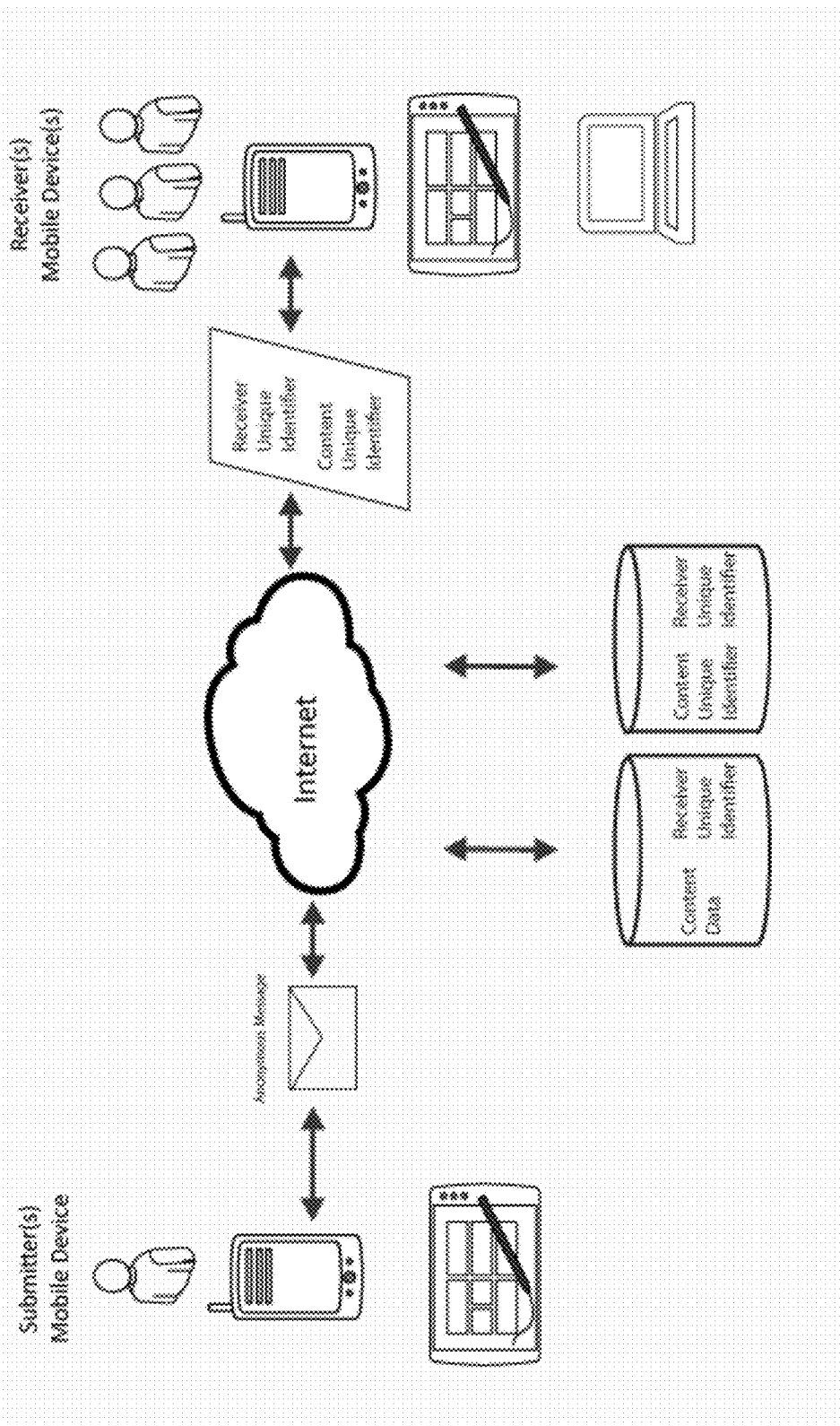
FIG. 20 shows Mobile to Mobile Message Sending and Receiving.

FIG. 20—Depicted by FIG. 20, A Mobile to Mobile Message Sending and Receiving—The system includes a server 15 (and 540), that is accessible by Submitter(s) comprising of at least one student(s) 1, parent(s) 3, staff/authorized parties 6, residents/community members 9 of the community, and/or other Submitter(s) 7 via a network that is connected to the Internet, world wide web, any virtual network, a WAN (wide-area network), and/or LAN (local-area network). The server 15 (and 540) is connected to at least one of the databases 18, in conjunction with 21, which uniquely identifies content, messages, identity information, and information/content data 12 and matches the submission to the authorized receiving party(s) designated to receive the submission. The database 18 enables encryption of the identity and/or content data and generates a Content Unique Identifier 22 for the Submitter identifying content so that it is anonymously sent to the intended recipient(s). The system 37 is anchored through the Internet, a virtual network, WAN and/or LAN and is, thus, accessible by PDA, tablet, smartphone, mobile device, or other device with Internet, virtual network, WAN, and/or LAN connectivity.

Also via the Internet, a virtual network, WAN, and/or LAN by authorized person(s)/receiver(s) such as school superintendent 27, principal 30, counselor 33, law enforcement official(s) 36, and/or other receiver(s) 34. Because of the inventive network's use of the Internet, a virtual network, WAN, and/or LAN, this information is accessible to administrators via PDA, mobile device, smart phone, tablet, or other mobile device with Internet, a virtual network, WAN, and/or LAN connectivity. As a result of this accessibility, school administrators and other personnel are able to access messages, by log-in using Receiver Unique Identifier 20 which is verified by Host Administration Device 21, to which they are an intended recipient, and communicate with the submitting party, or forward the received message to other parties via e-mail, text, and/or other communication methods.

FIG. 21—A Mobile Phone 5000 with a space located at the top of the screen that can have a name/logo 2017, including a custom name, organization name, company name, nickname, custom text, symbols, shapes, icons, buttons, touch sensitive areas and/or custom logo, among other things utilizing and/or accessing UCI. The Mobile Phone with 5000 displaying top center button is for sending an incident utilizing a UCI. 5002 displaying glossary button is for a custom glossary of terms utilizing a UCI. 5003 displaying help button is for a custom help section utilizing a UCI. 5004 displaying notifications button is for accessing a school good will or time sensitive notifications utilizing and/or accessing UCI. 5005 displaying the Smart button is for a smart button section utilizing a UCI. 5006 displaying the Smart button screen for the submitter to report their anonymous or non-anonymous location utilizing a UCI. 5007 displaying the reveal your name area to type in your name if the submitter does not want to remain anonymous utilizing a UCI. 5008 displaying a pull-down menu and/or selection menu to say the school or organization that the submitter belongs to or is associated with. 5009 displaying a pull-down menu and/or selection menu for the submitter to select what type of incident type for their report. 5010 displaying a My Identity button to click on if they do not want to be anonymous. 5011 with an entry field for the submitter to type in their name or nickname. 5012 displaying a picture icon and/or clickable text for the submitter to add a their photo to not be anonymous. 5013 displaying a pull-down menu and/or selection menu to say the school or organization that the submitter belongs to or is associated with. 5014 displaying social media with a plus sign to add their personal social media sites to send notifications if they want to be non-anonymous. 5015 displaying incident contacts with a plus sign to add their personal incident report contacts to send notifications if they want to be non-anonymous. 5016 displaying a save/reveal button and/or text to save their information for reports utilizing a UCI.

Figure 22:
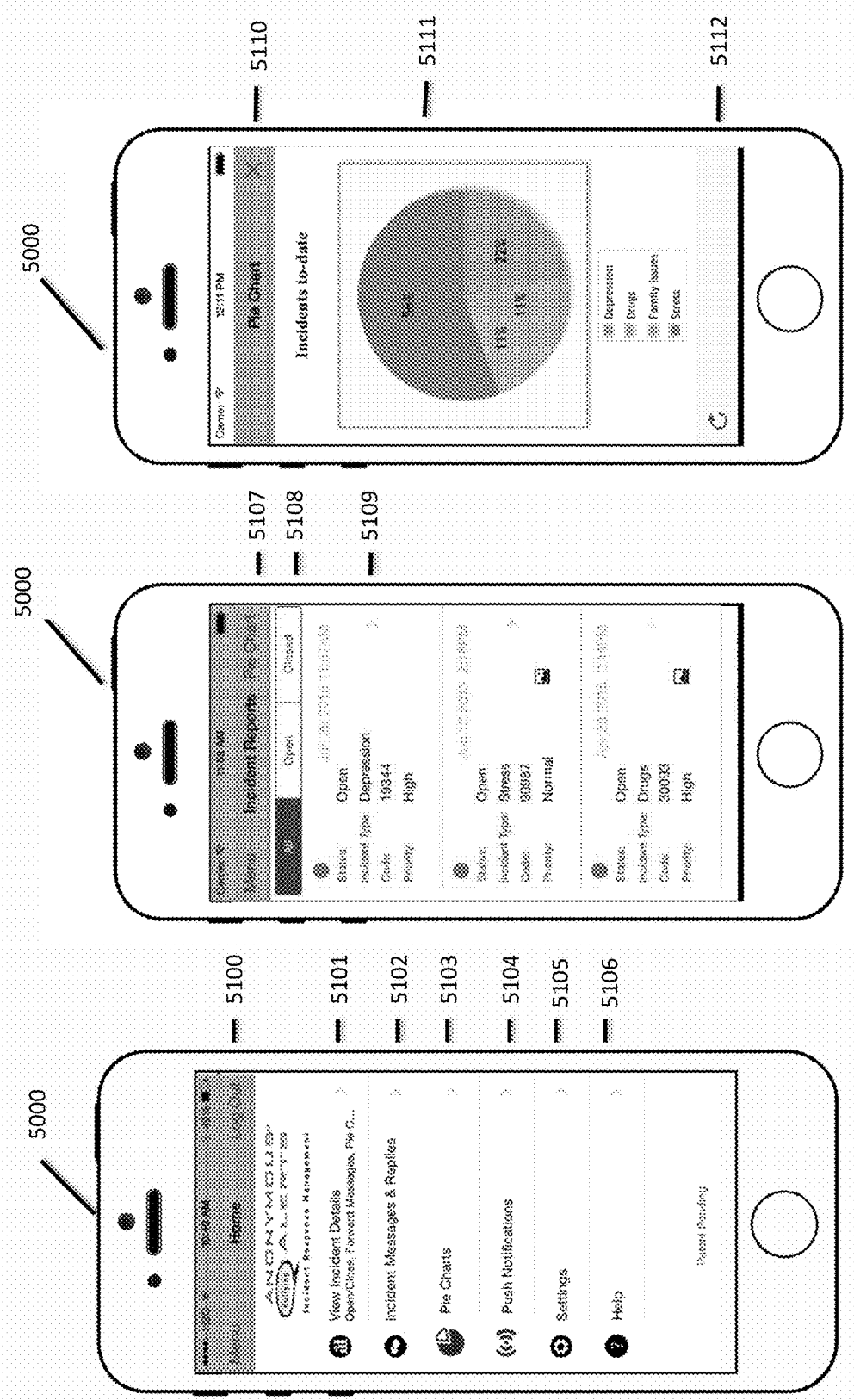
FIGS. 22-26 show various incident management, administrative, and/or at least 2-way anonymous communications app screens.

FIG. 22 shows three screens of an app appearing on a Mobile Phone 5000. The first of the three app screens depicted in FIG. 22 shows buttons for logging the user out of the app 5100, viewing incident details submitted by the users 5101, viewing incident messages & replies submitted 5102, viewing Pie Charts related to incidents or location 5103, accessing Push Notification Features 5104, accessing user settings 5105, and accessing Help/Instruction about the app 5106. The second of the three app screens depicted in FIG. 22 shows buttons for displaying Pie Charts related to incidents or location 5107, filtering reports based on status (e.g., All, Open or Close) 5108, and shows a clickable screen for briefly describing the incident 5109. The third of the three app screens depicted in FIG. 22 shows buttons for closing the presented screen 5110 and refreshing the screen 5112, and shows a screen area for displaying the pie chart 5111.

Figure 23:
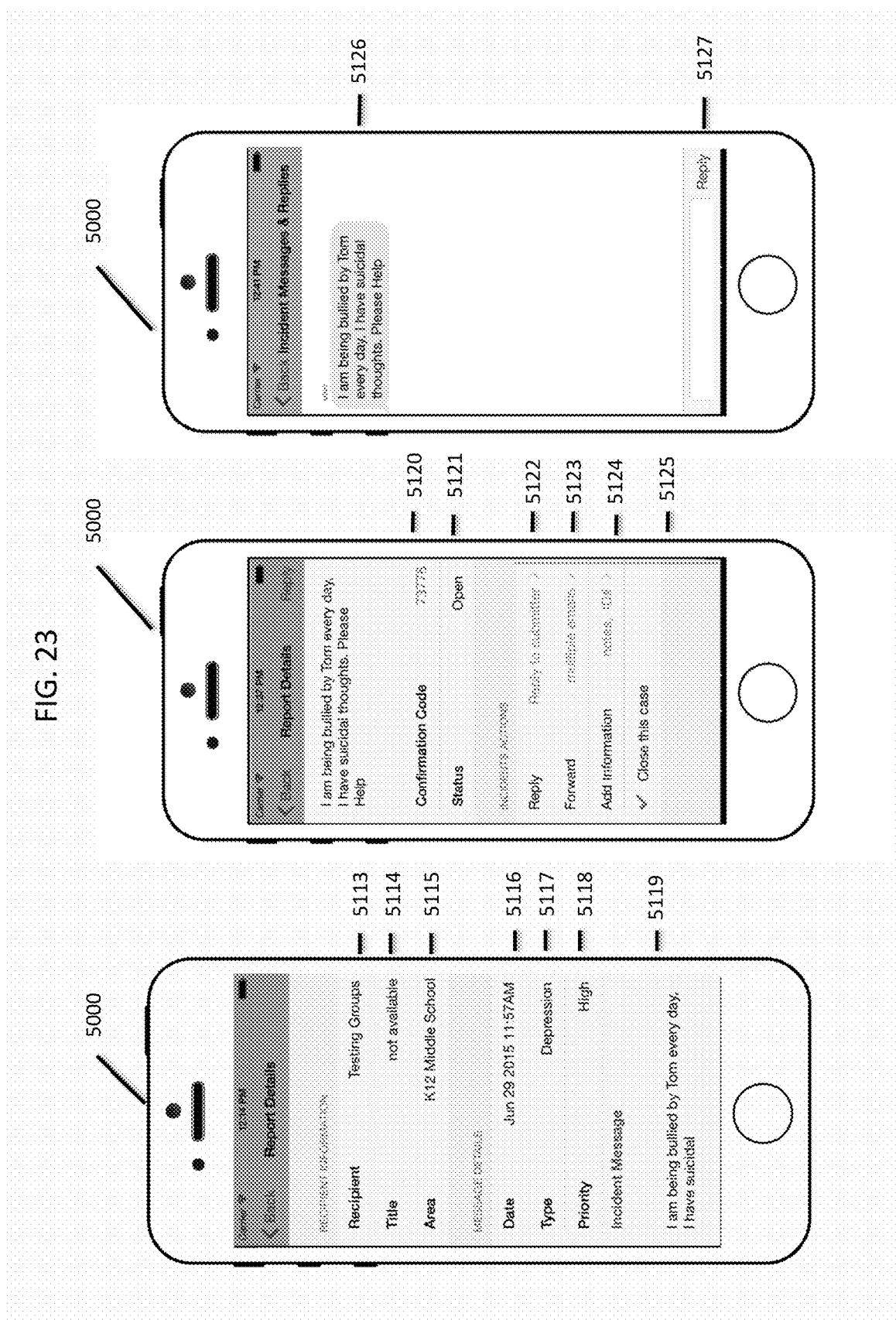

FIG. 23 shows three screens of an app appearing on a Mobile Phone 5000. The first of the three app screens depicted in FIG. 23 shows screen areas for displaying the recipient name 5113, the title of the recipient 5114, the name of the building/area where the incident occurred 5115, the date of the incident 5116, the type of the incident 5117, the incident priority 5118, and the incident message 5119. The second of the three app screens depicted in FIG. 23 shows screen areas for displaying the confirmation code 5120 and the status of the incident 5121, and buttons for replying to the person who submitted the incident message 5122, forwarding the incident report via email 5123, adding more information (e.g., notes or Student ID numbers) of person involved with the submitted incident 5124, closing the case of the submitted incident report 5125, and sending the reply of the message submitted. The third of the three app screens depicted in FIG. 23 shows a screen area for displaying the incident messages and replies 5126 and a button for replying to the incident messages and replies 5127.

Figure 24:
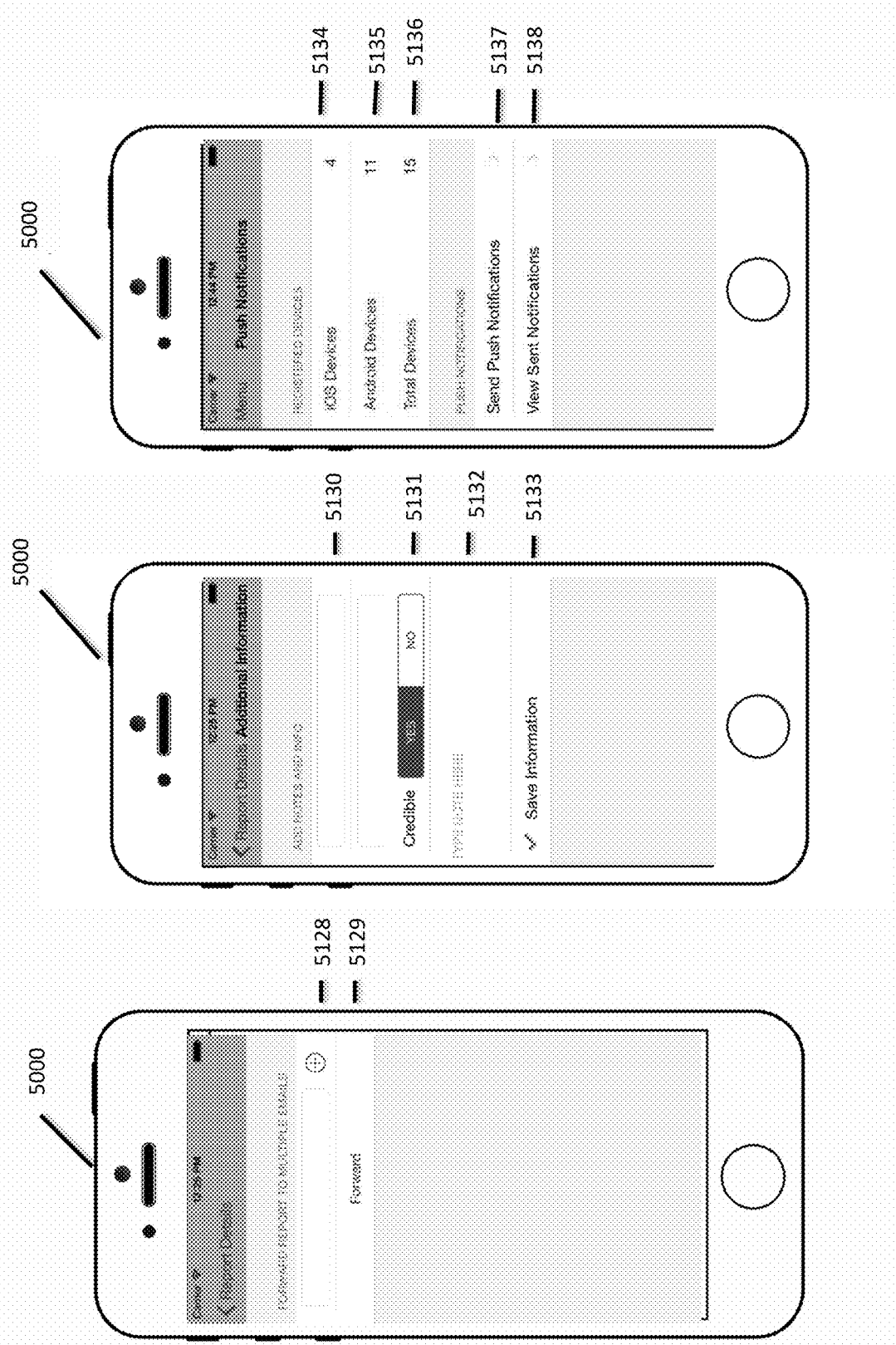

FIG. 24 shows three screens of an app appearing on a Mobile Phone 5000. The first of the three app screens depicted in FIG. 24 shows buttons for adding email addresses 5128 and forwarding the report to the email addresses added 5129. The second of the three app screens depicted in FIG. 24 shows text fields for adding the name of a person involved with the submitted incident 5130, and adding notes related to the submitted incident 5132, and shows buttons for describing credibility of the submitted incident 5131 and saving notes 5133. The third of the three app screens depicted in FIG. 24 shows screen areas for displaying the number of iOS devices registered for push notifications 5134, the number of Android devices registered for push notifications 5135, and the total number of registered devices registered for push notifications 5136, and shows buttons for accessing the features of sending push notifications 5137 and accessing the report of sent push notifications 5138.

Figure 25:
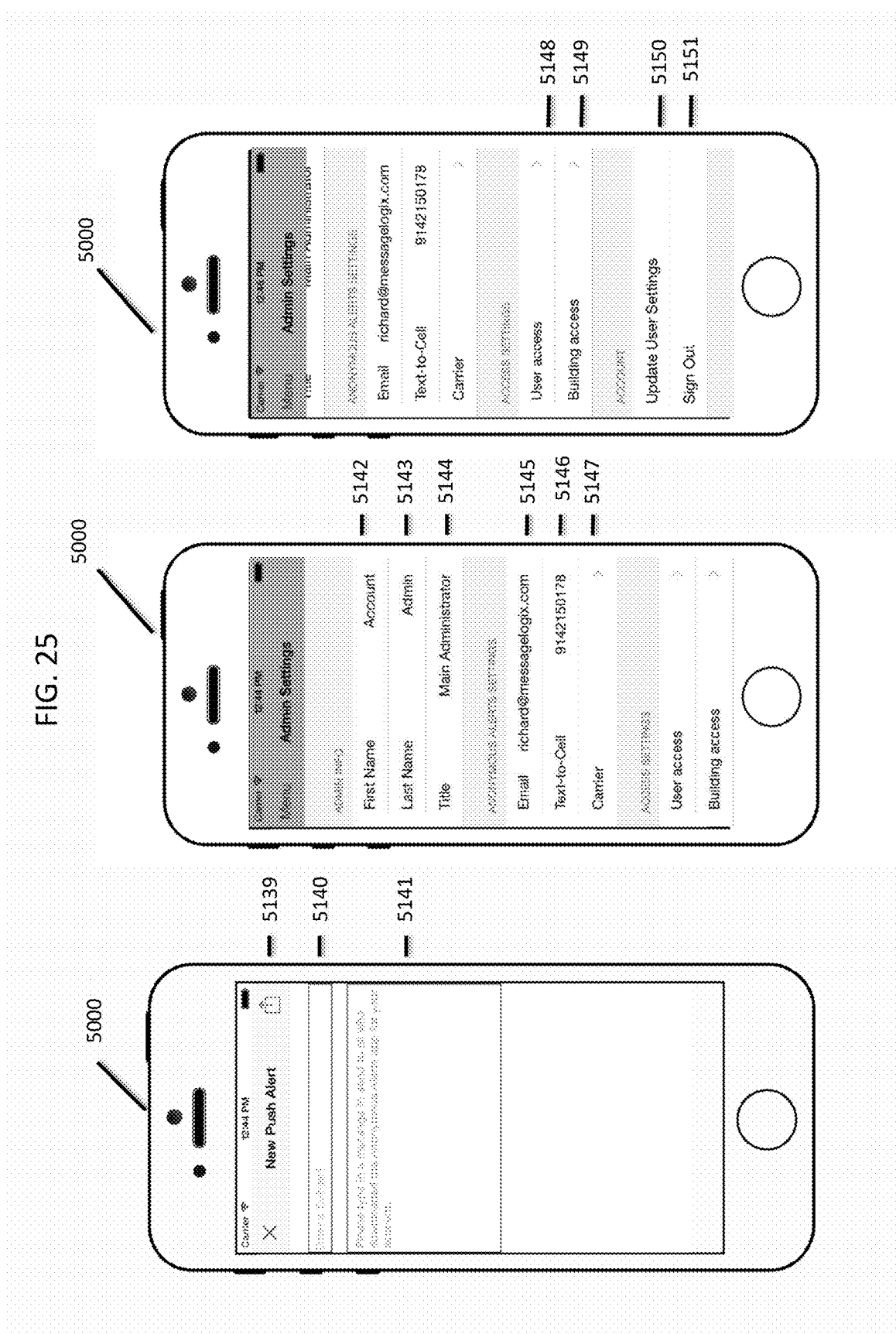

FIG. 25 shows three screens of an app appearing on a Mobile Phone 5000. The first of the three app screens depicted in FIG. 25 shows a button for sending push notifications 5139, and editable text fields for entering the subject of push notifications 5140 and the message of the push notifications 5141. The second of the three app screens depicted in FIG. 25 shows screen areas for displaying the first name of the user 5142, the last name of the user 5143, the title of the user 5144, the email of the user 5145, the phone number of the user 5146, and the user's phone carrier 5147. The third of the three app screens depicted in FIG. 25 shows buttons to display the user access 5148, display the building access 5149, update the user's settings 5150, and sign out 5151.

Figure 26:
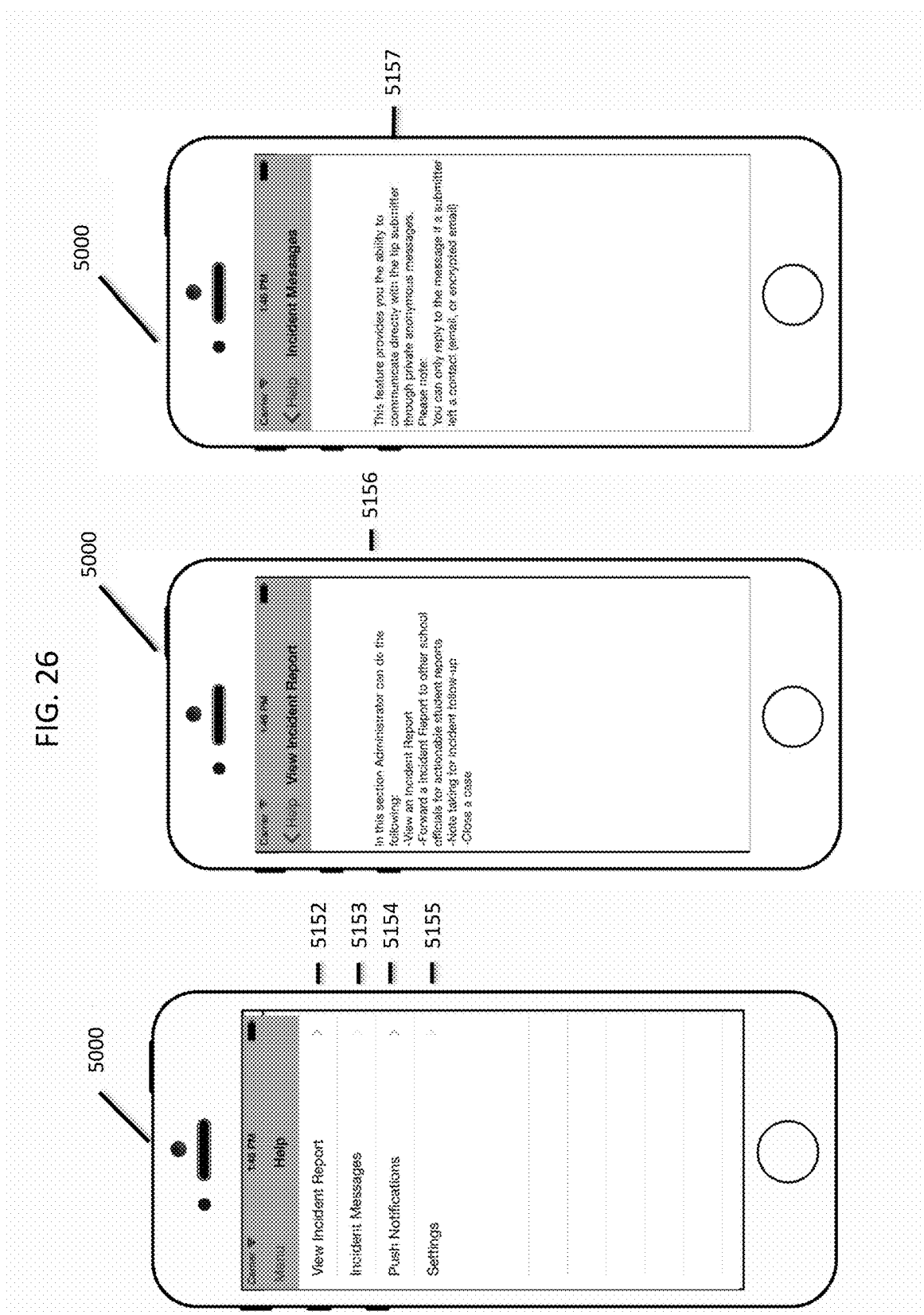

FIG. 26 shows three screens of an app appearing on a Mobile Phone 5000. The first of the three app screens depicted in FIG. 26 shows buttons for accessing instructions about View Incident Report feature 5152, instructions about Incident Messages 5153, instructions about Push Notifications 5154, and instructions about Settings 5155. The second of the three app screens depicted in FIG. 26 shows non editable text of instructions about Viewing Incident Report 5156. The third of the three app screens depicted in FIG. 26 shows non editable text of instructions about Settings 5157.

In at least one embodiment, the application flow is as follows: A Submitter presses Smart Button icon/button to activate SmartButton. Legal information (not shown in drawings) appears informing the user that said user must agree to (only first time use) terms that state that the user will not abuse the app or use it for false reporting, and that the My Identity information will not be linked to Anonymous Alerts reporting, among other terms. A User clicks on Smart Button. After pressing the Smart Button, the GPS status is checked and verified. If GPS is turned off, user gets a prompt to go to settings and turn on GPS location. If GPS is turned on, "My Identity" 5006 information is checked. If "My Identity" information is not filled out a prompt appears asking "Do you want to remain anonymous or fill out more information?". If the selection is yes, a prompt appears saying "Select ORANGE" [not shown in drawing] smart button again to submit additional information below" and additional information, such as "reveal your name (optional)", "Select School (optional)", "Select incident type (optional), and/or "push alert to social media (optional)", appear. If the selection is no, no more prompts appear. If the "My Identity" information is filled out an alert will be sent to contacts saved under "My Identity" profile page with all the Identity information already filled out, and a prompt will appear only for user to "Select incident type (optional)". User can fill out "My Identity" page at any time and can fill out their name, school, add a picture, add social media, and add contacts. The Smart Button will be GREY when user is unable to press button in 3-5 minute time out.

While the instant invention has been shown and described in accordance with preferred and practical embodiments thereof, it is recognized that departures from the instant disclosure are contemplated within the spirit and scope of the present invention. Therefore, the true scope of the invention should not be limited since other modifications will become apparent to those skilled in the art upon a study of the claims, drawings, descriptions, explanations, and specifications herein.

COMPONENT LIST FOR DRAWINGS

Following is a partial list of the components depicted in the drawings:
Component Number Component Description
1 Student
3 Parent
6 Staff/Authorized Parties
7 Other Submitter(s)
9 Resident/Community Member
12 Information/Content
15 Server
18 Database (includes Content Data 19+Receiver Unique Identifier 20)
19 Content Data
20 Receiver Unique Identifier
21 Content Unique Identifier 22+Receiver Unique Identifier 20
22 Content Unique Identifier
24 Receiver Unique Identifier 20+Geographic Code ID 203
27 Superintendent
30 Principal
33 Counselor
34 Other Receiver(s)
36 Law Enforcement
37 System
39 Cloud (includes one or more of the following: Internet, a virtual network, social network, world wide web, WAN, and/or LAN)
42 Message Window
43 Translation
44 School Building
45 Person(s) to Contact
48 Priority
51 Incident Type
52 Locations
53 Download iPhone App
54 Message
56 Add photo/image/video/sound
57 "1-Step Submit" or "Submit"
59 Upload
60 Message submitter (anonymous identity) receives a unique identifier and confirmation from system
61 Submit/Cancel
63 Message submitter receives a unique identifier to contact the school about message without providing identity
64 Choose File or Cancel
66 Message submitter has option to provide an e-mail address and/or other information that submitter decides to encrypt or not
67 Crop
68 Open
69 Message submitter enters e-mail and/or other information and clicks SUBMIT
72 Admin Logs in to System Account
75 Admin clicks Account on Menu bar
78 Admin enters the new user's: name/title
81 Admin determines type of notification person will receive
84 Admin enters the new user's: E-mail address/Text to Cell number/Phone Number
87 Logs in
90 Selects Anonymous Alerts from Campaign Track or reporting system
93 Data Range/Message Type
96 System runs Query
99 Chooses message option
102 View message history with timestamp
105 Forward message via e-mail to another person
111 Message Receiver/Message Recipient OPTION 2 REPLY TO MESSAGE PROCESS
114 System opens new window with text box
117 Clicks "1-Step Submit" or "Submit"
203 Geographic Code ID
510 Receiver(s)
520 Submitter(s)
530 Cloud (includes one or more of the following: Internet, a virtual network, social network, world wide web, WAN, and/or LAN)
540 Server
545 Database
550 System Administrator
560 3rd Party Forwarding
570 Input Output Devices
575 Collective Memory
581 Logging Processor

582 Unique Identifier Engine
583 Unique Receiver Identifier Engine
584 Report Generator
1702 CPU (Processor)
1704 Ram
1706 Removable memory
1708 Network
1710 Network interfaces
1712 Hard disk
1714 Rom
1716 Screen
1716A Visual Keyboard
1718 Keyboard
1720 Mouse
1722 Speakers
1724 Microphone
5000 Mobile Phone
5001 Send Incident Report Menu Button
5002 Glossary Menu Button
5003 Help Menu Button
5004 Notifications Menu Button
5005 Smart Button Menu Button
5006 Smart Button/Locate Menu Button
5007 Reveal Your Name Menu Button
5008 Select School Menu Button
5009 Select Incident Type Menu Button
5010 My Identity Menu Button
5011 Reveal Your Name Menu Button
5012 Add Your Picture Menu Button
5013 Select Your School Menu Button
5014 Add Social Media Menu Button
5015 Add Incident Contacts Menu Button
5016 Save/Reveal Menu Button
5017 Name/Logo
5100 Log Out Menu Button
5101 View Incident Details Menu Button
5102 Incident Messages & Replies Menu Button
5103 Pie Charts Menu Button
5104 Push Notifications Menu Button
5105 Settings Menu Button
5106 Help Menu Button
5107 Pie Charts Menu Button
5108 All/Open/Closed Status Menu Buttons
5109 Incident Description Screen
5110 Exit Menu Button
5111 Pie Chart
5112 Refresh Menu Button
5113 Name of Recipient
5114 Title of Recipient
5115 Area of Recipient
5116 Date of Message
5117 Type of Message
5118 Priority Level of Message
5119 Incident Message
5120 Confirmation Code of Report
5121 Status of Report
5122 Reply Menu Button
5123 Forward Menu Button
5124 Add Information Menu Button
5125 Close Case Menu Button
5126 Incident Messages & Replies
5127 Reply Menu Button
5128 Add Email Menu Button
5129 Forward Menu Button
5130 Add Notes and Info
5131 Credibility Menu Button
5132 Notes
5133 Save Information Menu Button
5134 Number of iOS Devices
5135 Number of Android Devices
5136 Total Number of Devices
5137 Send Push Notifications Menu Button
5138 View Sent Notifications Menu Button
5139 Share Menu Button
5140 Subject
5141 Message
5142 First Name of User
5143 Last Name of User
5144 Title of User
5145 User's Email Information
5146 User's Text-To Cell Information
5147 User's Carrier Information
5148 User Access Menu Button
5149 Building Access Menu Button
5150 Update User Settings Menu Button
5151 Sign Out Menu Button
5152 View Incident Report Menu Button
5153 Incident Messages Menu Button
5154 Push Notifications Menu Button
5155 Settings Menu Button
5156 View Incident Report Screen
5157 Incident Messages

DEFINITIONS

These definitions are in addition to the words and phrases specifically defined in the body of this application.

Anonymous Alerts: is a registered trademark of Message Logix, Inc., having US Trademark Registration No. 4,306994.

Device: Comprises at least one of electronic device, computer, mobile device, digital scanner, image scanner, scanner, handheld device, reader device, or server.

Digital Scanner, Image Scanner: an electronic device that generates a digital representation of an image for data input to a computer.

Electronic Device: a device that accomplishes its purpose electronically.

Hand-held computing device: a device that can have an operating system (OS), and usually can run various types of application software, known as apps. Most hand held devices can also be equipped with WI-FI, Bluetooth and GPS capabilities that can allow connections to the Internet and other Bluetooth capable devices such as an automobile or a microphone headset. A camera and/or media player feature for video or music files can also be typically found on these devices along with a stable battery power source. Other types of Mobile Devices include tablet computers. As in a personal digital assistant ("PDA"), the input and output are often combined into a touch-screen interface, Smartphones and PDAs Enterprise Digital Assistants may offer integrated data capture devices like barcode, RFID, optical, Optical Character Recognition, and smart card readers.

Internet: includes generically/commonly known internet networks, virtual networks, wide area networks (WAN) and local area networks (LAN).

Message or communication: a generic term used to refer to a communication whether it be made in writing, by voice, by image (photo, picture, etc.) or otherwise, or in any combination thereof.

Mobile Device: is a generic term used to refer to a variety of devices that allow people to access data and information. A Mobile Device (can also be known as a handheld computing device, handheld device, handheld computer or simply handheld) can also be a hand-held computing device, which can have a display screen and can also have a touch input and/or a miniature keyboard.

User Interface: is the means by which a user can communicate with the method of the invention, e.g., a computer, fax, voice prompt, key board, touch pad, phone, mobile device and/or smart device.

Virtual: occurring, relating to, or existing within a virtual reality or for all practical purposes an existence which is possible or inferred.

Unique Identifier: a unique code identifying person(s) and/or group(s) generated through software combined with at least one unique algorithm.

Receiver's Unique Identifier: a unique code identifying receiver(s) (and not Submitter(s)) generated through software combined with at least one unique algorithm.

Host System Administration Device: (located at system host's location) The master system communicating with all central and local systems.

Authorized Person: Any designated person possessing authority to instantiate action based upon data supplied by a Submitter.

Unidentified Submitter: a Submitter who does not wishing to remain anonymous.

Virtual Network: a network occurring, relating to, or existing within a virtual reality Social Network: a private and/or website or network that enables the connection of any number of users for any number of purposes LAN: local area networks (LAN).

WAN: wide area networks (WAN).

System Administration Device: (located at client's location) the input device used by the system administrator at any venue or locality.

information/submission from Submitter: information and/or a submission that can then be responded to and/or acted upon.

Submitter: a person who and/or group that submits information.

Sender: a Submitter

Receiver: a person who and/or group that receives information.

As used herein, the term "Smart Button" is defined as a switch either virtual or physical which is activated accessed and/or utilized by a submitter to initiate and/or continue communication prior, during and/or after an incident or event takes place transmitting the information, data, and/or location of significance and importance to and from the submitter to receiver(s).

As used herein, the term "and/or," when used in a list of two or more items, means that any one of the listed items can be employed by itself, or any combination of two or more of the listed items can be employed. For example, if a device is described as containing components A, B, and/or C, the composition can contain A alone; B alone; C alone; A and B in combination; A and C in combination; B and C in combination; or A, B, and C in combination.

What is claimed:

1. A computer implemented method for reporting at least one live incident in real-time comprising following steps:
   accessing a touch sensitive "Smart Button" area on a display of a computer, mobile device or smart device, wherein a Smart Button activation is initiated with a user interface, mouse click, physically pressing a predefined screen area and/or gesture recognition;
   at least one submitter, which is a user, enters or edits data, adds identity information and/or inputs incident report to the user interface;
   the at least one submitter decides a degree of anonymity to select when accessing/activating use of the Smart Button from the at least one user-interface of an input device of the computer, the mobile device or the smart device, connected to at least one of an Internet, a virtual network, a social network, a world wide web, WAN, and LAN,
   said incident report contains information;
   said activation/accessing of the Smart Button causes the input device to be located and/or automatically enabled to be located employing at least one of Global Positioning System (GPS), IP location, proximity to at least one cell tower, proximity to at least one WiFi and/or other signal, Radio Frequency Identification (RFID) tagging, Near Field Communications, infrared, radio frequency, establishing prior known location and/or association with at least one known location;
   said activation further initiates the following steps:
   generating a first Unique Identifier associated with the incident report and/or the information to be submitted;
   capturing, accessing, or generating a second Unique Identifier for the message/information for the incident report to be submitted;
   capturing, accessing or generating a third Unique Identifier for the device sending the incident report;
   creating, accessing, and/or utilizing at least one Receiver Unique Identifier associated with at least one receiver;
   generating at least one custom incident or event report and location to the at least one receiver with the at least one Receiver Unique Identifier;
   accessing, inputting and/or submitting at least one custom standardized template the submitter can enter and/or select from a dropdown menu the incident report or event details, name, e-mail address, phone number, school or organization, photo, audio, video, alias, or other identifying information associated with the submitter;
   typing a custom message within a data entry field within the custom standardized template; manually turning on a GPS services if not currently available with one click and/or interaction with a touchscreen;
   adding the submitter's picture and save and transmit if the submitter does not want to be anonymous;
   creating reports for at least one administrator and/or authorized receiver(s);
   sending notification of the reports from the submitter to the authorized receiver(s) sent via text, email, voice and/or push mobile notification;
   location of the at least one submitter on at least one map is included in the notification of the reports.

2. The method of claim 1, further comprising at least one of the following steps:
   further comprising the creation, access, utilizing, of a group to be displayed within a drop down menu and/or list comprising at least one authorized person to be contacted;
   wherein said at least one standardized customized template includes a drop-down list for selecting at least one type of event or incident communication;
   further comprising a step wherein at least one administrator or receiver can view or access a report a map, graph, table will be displayed with the GPS location of at least one submitter;

further comprising the emitting of a custom sound, light, vibration to be received and acted upon by receiver;

further comprising a step whereby the location of at least submitter is tracked using at least one map locator;

wherein said at least one standardized customized template includes a drop-down list and/or other selectable switch, button, or interface for at least one submitter sending or displaying Incident Report, Glossary, Help, Notification, Smart Button or other information.

3. The method of claim 1, wherein said Notification is the receipt through the device of push notifications and other information relating to among other things counseling, time sensitive or goodwill messages to submitter(s).

4. The method of claim 1, wherein the incident report is carried forth via at least one of the following: 2-way text-to-cell communication, 2-way voice communication, 2-way Social Media communications, 2-way texting, 2-way phone, 2-way SMS or MMS, 2-way communication, 2-way chat, about information, and, when Notification is through push notifications, the 2-way communication Push Notifications is between the sender/submitter(s) and the receiver(s).

5. The method of claim 1, further comprises that the at least one receiver can send at least one response message back to the at least one submitter in response to the unique identifier and related content received by receiver(s) from the submitter(s).

6. The method of claim 1, wherein the at least one submitter may submit information as at least one message via at least one user-interface using at least one standardized template on at least one of a mobile device, smart pad, electronic device, mobile phone, input device, communication device, tablet, computer, fax, facsimile machine, phone, smart device and/or smartphone.

7. The method of claim 1, wherein the unique identifier is generated using at least one unique algorithm.

8. The method of claim 1, wherein the method comprises a native applications specific to the device being used.

9. The method of claim 1, wherein the at least one submitter may submit information as at least one message via at least one user-interface using at least one standardized template on at least one of a mobile device, smartpad, electronic device, mobile phone, input device, communication device, tablet, computer, fax, facsimile machine, phone, smart device and/or smartphone.

10. The method of claim 1, further comprising at least one of the following steps:
    inputting the communication being sent from the at least one submitter utilizing at least one of the customized standardized template(s);
    utilizing an icon to send the submitter communication to a data server using a unique identifier.

* * * * *